United States Patent [19]
Brent et al.

[11] Patent Number: 5,442,802
[45] Date of Patent: Aug. 15, 1995

[54] ASYNCHRONOUS CO-PROCESSOR DATA MOVER METHOD AND MEANS

[75] Inventors: Glen A. Brent, Red Hook; Thomas J. Dewkett, Staatsburg, both of N.Y.; David B. Lindquist, Raleigh, N.C.; Casper A. Scalzi, Poughkeepsie, N.Y.

[73] Assignee: International Business Machines Corporation, Armonk, N.Y.

[21] Appl. No.: 240,301

[22] Filed: May 9, 1994

Related U.S. Application Data

[63] Continuation of Ser. No. 816,917, Jan. 3, 1992, abandoned.

[51] Int. Cl.⁶ ............................................. G06F 12/00
[52] U.S. Cl. ................... 395/200.08; 364/DIG. 1; 364/DIG. 2; 364/228.6; 364/238.4; 364/254.3; 364/256.3; 364/957.1; 364/960; 395/474; 395/494; 395/492; 395/419; 395/650
[58] Field of Search ............... 364/228.6, 230, 230.2, 364/254.5, 255.7, 256.3, 256.4, 256.8, 260, 260.1, 260.2, 260.3, 263, 263.2, 267.3, 270.5, 270.8, 270.9, 931.4, 931.41, 931.49, 931.5, 941, 941.4, 942.05, 948.05, 948.3, 948.32, 948.33, 955.5, 937, 957.1, 957.8, 957.5, 957.6, 961.2, 962, 962.1, 964, 964.6

[56] References Cited

U.S. PATENT DOCUMENTS

| | | | |
|---|---|---|---|
| 4,272,819 | 6/1981 | Katsumata et al. | 364/200 |
| 4,277,826 | 7/1981 | Collins et al. | 305/400 |
| 4,373,179 | 2/1983 | Katsumata | 395/400 |
| 4,476,524 | 10/1984 | Brown et al. | 395/325 |
| 4,731,739 | 3/1988 | Woffinden et al. | 395/250 |
| 4,797,812 | 1/1989 | Kihara | 364/200 |
| 4,930,065 | 5/1990 | McLagan et al. | 395/275 |
| 5,088,031 | 2/1992 | Takasaki et al. | 395/400 |
| 5,095,420 | 3/1992 | Eilert et al. | 395/400 |
| 5,123,094 | 6/1992 | MacDougall | 395/375 |
| 5,134,698 | 7/1992 | Imamura et al. | 395/425 |
| 5,136,698 | 8/1992 | Okamoto | 395/375 |
| 5,159,677 | 10/1992 | Rubsam et al. | 395/425 |
| 5,237,668 | 8/1993 | Blandy et al. | 395/400 |
| 5,251,312 | 10/1993 | Sados | 395/425 |
| 5,301,287 | 4/1994 | Herrell et al. | 395/400 |
| 5,386,560 | 1/1995 | McCauley et al. | 395/650 |

OTHER PUBLICATIONS

"Advanced DMA Comprocessor for 32-bit Microsystems", Microprocsessors and Microsystems, vol. 13, No. 6, pp. 413–420, Jul., 1989.

"Hardware Switch for DMA Transfer to Augment CPU Efficiency", Microprocessors and Microsystems, vol. 7, No. 2, pp. 117–120, Apr., 1993.

*Primary Examiner*—Alyssa H. Bowler
*Assistant Examiner*—Valerie Darbe
*Attorney, Agent, or Firm*—Bernard M. Goldman

[57] ABSTRACT

Virtual addressing is available to a co-processor to asynchronously control the movement of multiple page units of data between different locations in the same or a different media, e.g. main store (MS) and expanded store (ES), or both may be in ES, or both may be in MS. The co-processor controls the asynchronous page movement in parallel with continuing execution of other instructions by the central processor (CP) which requested the page movement. Each page to be moved is specified by an MSB (Move Specification Block). A set of MSBs are addressed by a special type of channel control word (CCW) in a channel program containing one or more CCWs, some of which may address one or more sets of MSBs (one MSB set per CCW) to control the movement of any number of pages. The CPU executes a special ADM SSCH (start subchannel) instruction that passes the page move work to the co-processor to perform the requested page transfer involving one or more sets of MSBs. Flag fields in source and sink specifications in each MSB contains a plurality of flag bits that define: the associated source or sink media, whether the specified address is to be translated as a virtual address or to be handled as an absolute address, whether replication of the source page(s) is to be done at the sink location, and whether the page(s) are to be erased by only accessing the sink pages to control the writing of a predetermined padding character, such as zero, through-out the content of the sink page(s).

13 Claims, 12 Drawing Sheets

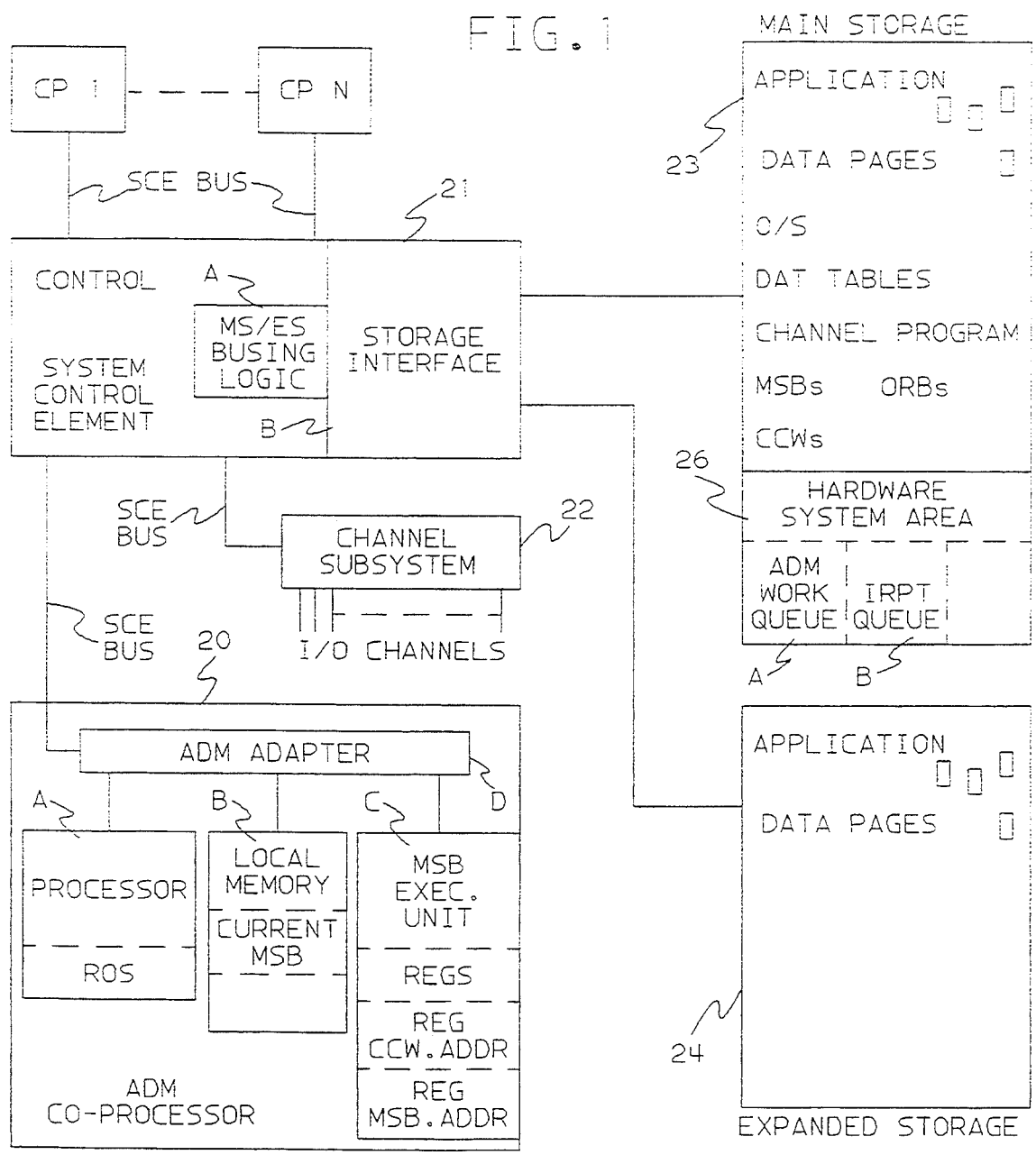

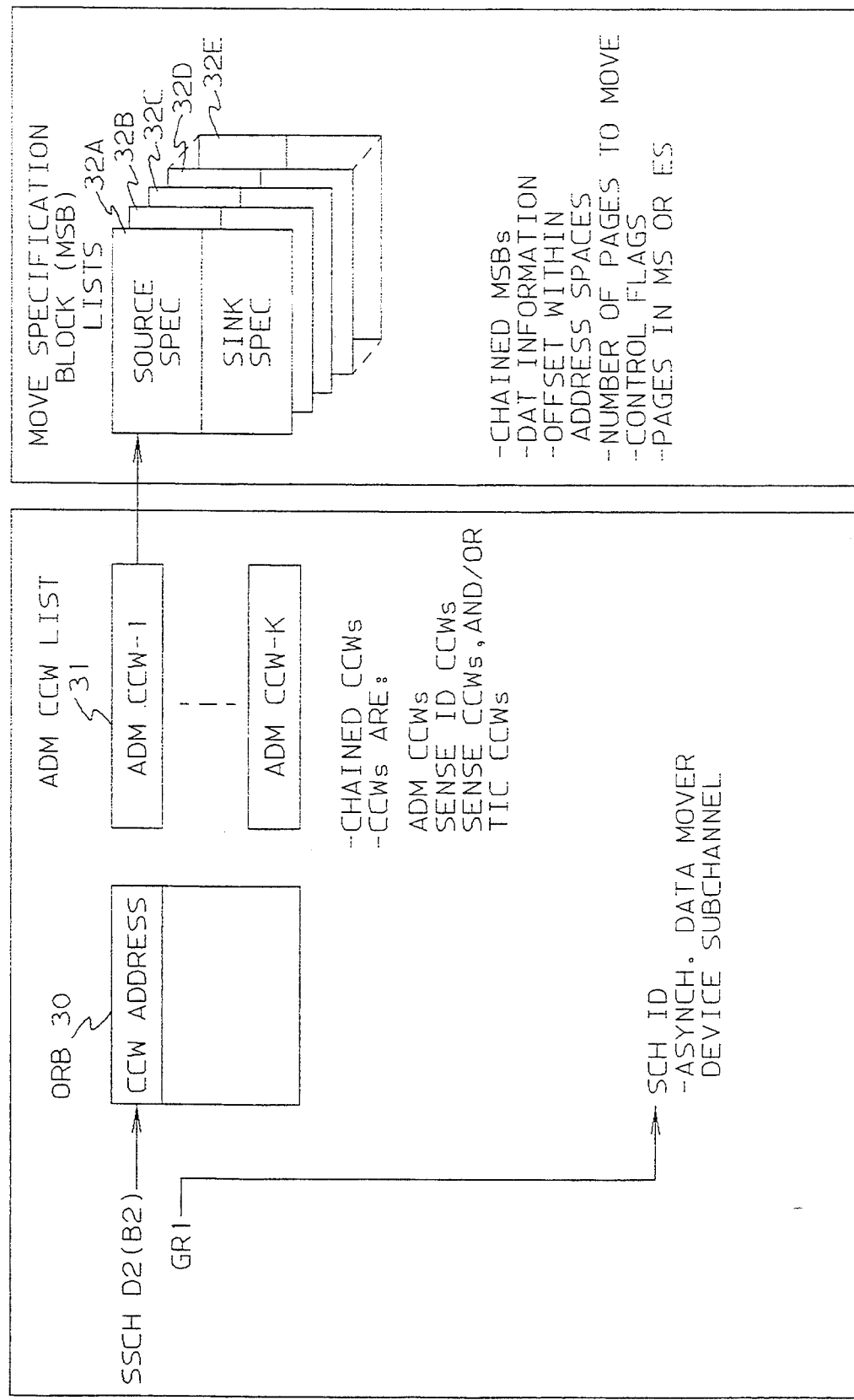

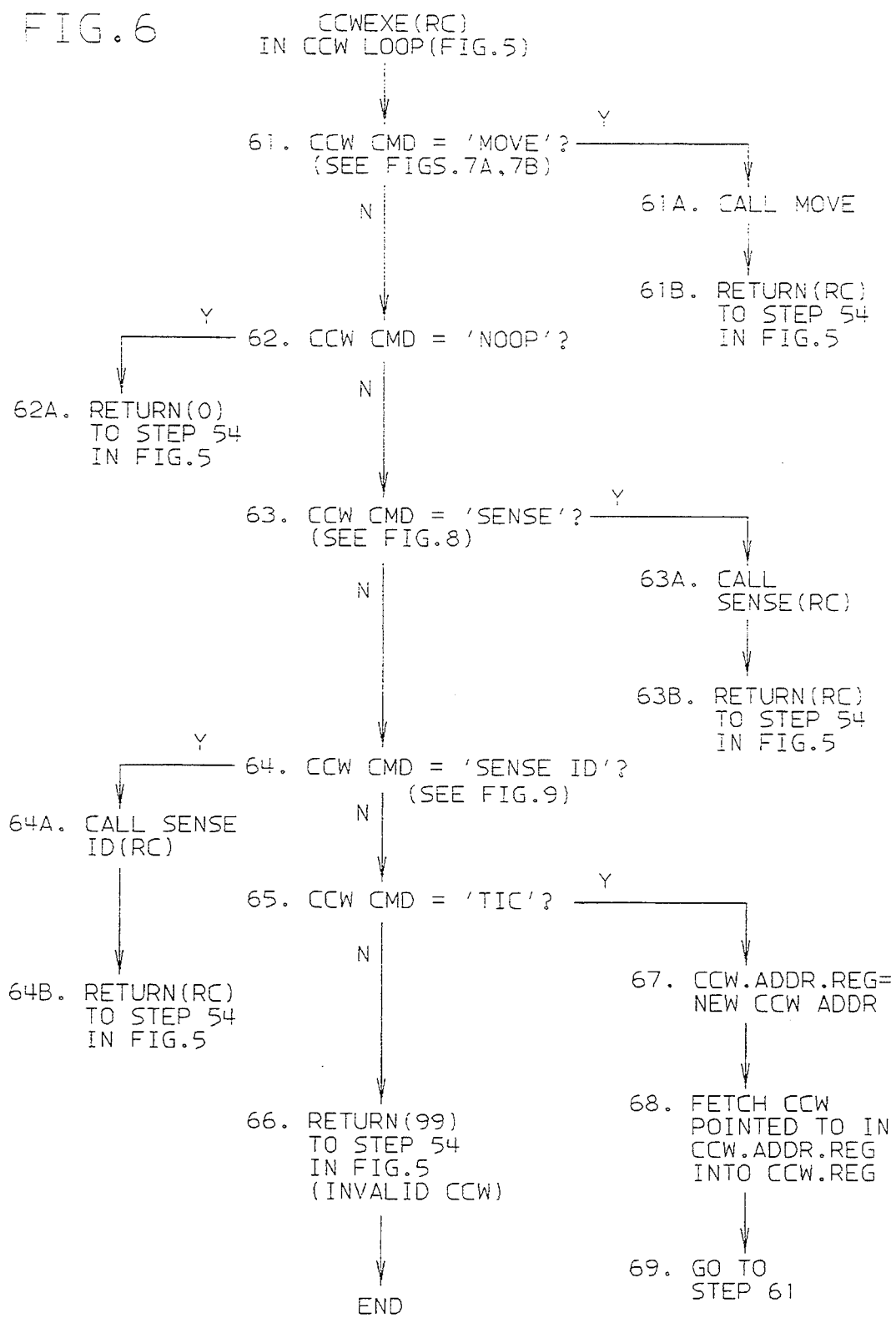

FIG.8
SENSE(RC) IN CCWEXE(FIG.6)
81. STORE AT CCW(DATA ADDRESS) CURRENT
    VALUES OF THE FOLLOWING REGS:
    CCW.ADDR.REG
    MSB.ADDR.REG
    PAGE.CNT.REG
    SOURCE.OFFSET.REG
    SINK.OFFSET.REG
    SOURCE.STD.REG
    SINK.STD.REG
82. RETURN(0) TO STEP 63B IN FIG.6
FIG.9
SENSE ID(FIG.6)
91. STORE AT CCW(DATA ADDRESS)
    CU TYPE MODEL #
    DEV TYPE MODEL #
92. RETURN(0) TO STEP 64B IN FIG.6

10

ASYNCHRONOUS CO-PROCESSOR DATA MOVER METHOD AND MEANS

CROSS REFERENCE TO RELATED APPLICATION

This application is a continuation of application Ser. No. 07/816,917, filed Jan. 3, 1992, now abandoned.

INTRODUCTION

The invention relates to providing a co-processor method and means for moving a plurality of pages simultaneously with the execution of instructions by the processor which requested the movement of the pages, which may be virtually addressed.

BACKGROUND

U.S. Pat. No. 4,476,524 (P09-80-009) uses real addressing of pages in main storage (MS) and in page store (PS) to asynchronously copy pages of data between MS and PS under control of a channel processor. A CP initiates the page transfer by executing a SIO (start input output) instruction which initiates a channel program comprised of channel control words (CCWs). U.S. Pat. No. 4,476,524 cannot use virtual addresses to move pages, and virtual addressing cannot be asynchronously forced into its method of operation. The subject invention does not use any real address in channel program CCWs to address pages.

U.S. Pat. No. 4,476,524 uses the real address within one of the two CCWs used per page to address the page. In U.S. Pat. No. 4,476,524 the first of the two CCW is either a PPI (prepare page in) or a PPO (prepare page out), and the second CCW is a page copy CCW in a variable chain of CCWs initiated by a SIO instruction. The CP may execute other instructions at the same time that the channel program is controlling the PS/MS page transfer of a variable number of pages. U.S. Pat. No. 4,476,524 does not disclose any move specification block (MSB), which is introduced by the subject invention for enabling virtual addressing in a CCW program.

European application 0 214 870 of Fujitsu (priority Feb. 9, 1985) describes and claims a synchronous page move instruction that operates on the central processor of a system. It is operand media dependent, i.e. it has an MS operand and an ES operand; while the subject invention is not media dependent among the media for which it is designed. This application does not disclose any MSB, introduced by the subject invention for enabling virtual addressing in a CCW program.

U.S. patent application Ser. No. 07/424,797, (P09-89-018) filed Oct. 20, 1989, now U.S. Pat. No. 5,237,668 discloses a move page MVPG synchronous instruction which moves a single page and the central processor cannot execute any other instructions until the page move is completed. This application does not disclose any MSB, introduced by the subject invention for enabling virtual addressing in a CCW program and only moves a single page at a time.

SUMMARY OF THE INVENTION

This invention provides a co-processor as an asynchronous interface between a processor requesting a service and the performance of that service by the co-processor.

This invention provides a co-processor as an interface between an application program (executing on any central processor in a multi-processor system) and the co-processor's performance of a service requested by the program.

This invention provides a co-processor to asynchronously control the movement of a set of pages concurrently with the continuation of execution by a central processor that requested the movement of the set of pages.

This invention provides a co-processor to asynchronously control the movement of a set of pages in the same medium or between different media concurrently with the continuation of execution by a processor that requested the movement of the set of pages.

This invention provides an asynchronous co-processor interface between a processor requesting a service and the performance of that service by the co-processor using predetermined virtual addresses.

This invention provides an asynchronous co-processor interface between a processor requesting a service and the performance of that service by the co-processor using predetermined virtual addresses in a unique data structure.

This invention provides an asynchronous co-processor interface between a processor requesting a service and the performance of that service by the co-processor using predetermined virtual addresses in a unique data structure accessed through an I/O channel program that uses real addressing.

This invention enables virtual addressing to be used by a co-processor to asynchronously control the movement of multiple page units of data between different locations which may be in ES and MS, or both may be in ES, or both may be in MS. A co-processor is used to control the asynchronous page movement in parallel with continuing execution by the central processor (CP) requesting the page movement, so that a single CP instruction can efficiently move a very large number of pages simultaneously with the execution of other instructions in the CP. Further, the page movement by the co-processor may be between different media in the same computer system.

The virtual or absolute addressing of the source and sink (destination) locations for each page to be moved is specified by an MSB (Move Specification Block). An embodiment of a co-processor, called an "Asynchronous Data Mover" (ADM), controls the movement of the pages by the MSBs. A set of MSBs are addressed by a special type of channel control word (CCW), and a channel program of one or more CCWs addresses one or more sets of MSBs (one set per CCW) to control the movement of any number of pages. The CCWs use real addressing (not virtual addressing) to address each set of MSBs. A Start Subcommand (SSCH) instruction to a special ADM Subchannel (SCH) is executed by a CP to initiate the ADM co-processor to start a page transfer controlled by one or more sets of MSBs. The SSCH instruction identifies the ADM subchannel and the ORB (Operation Request Block) pointing to the MSB CCW program (the location of the first CCW of that program). For example, the CP's general register (GR) 1 contains the ID of the subchannel involved while the address in the SSCH instruction (D2, B2) addresses the operation request block (ORB). The ORB contains the address of the channel program.

As in standard ESA/390 I/O operations, the SCH (subchannel) provides the logical link between the invoking program (the control program in this case) and particular asynchronous requests outstanding. Thus, where N special ADM SCHs have been allocated to communicate requests to the coprocessors, an operation completion interruption identifies which operation has completed by identifying the SCH used to initiate the operation as part of the information provided with the interruption. The control program keeps a record of which asynchronous operation has been assigned to each ADM SCH. Only one operation may be outstanding on a SCH at a time. The prior art does not teach the use of MSBs to perform virtual addressing of pages under control of the real addressing of the MSBs by a chain of CCWs initiated by a SSCH instruction to an ADM SCH.

The virtual addressing possible in the MSB instruction differs from the prior move page MVPG instruction in U.S. application Ser. No. 07/424,797 (PO9-89-018), now U.S. Pat. No. 5,237,608. That application requires the page movement be synchronous with central processor (CP) operations, wherein the CP cannot execute other instructions while its requested page movement is being done. On the other hand, the MSB co-processor asynchronously controls the movement of any number of pages while the processor requesting the page movement is executing other instructions. Addressing of the pages may be virtual or absolute.

The flag fields in the source and sink specifications within the MSB contain a plurality of flag bits that define: the associated source or sink media, whether the specified addresses are to be translated as a virtual address or to be handled as absolute addresses, whether replication of the source page(s) is to be done at the sink location, and whether the sink page(s) is to be erased by writing therein a predetermined character, e.g. all-zero data.

When virtual addressing is specified in the flag field of an MSB, the source and/or sink portion of the MSB contains a segment table descriptor (STD) that specifies the virtual address space containing the associated source or sink page. An offset field in each MSB contains the virtual address in the specified address space, or contains the real address if a real address is flagged in the MSB. If real addressing is specified in the flag field of an MSB, the STD field is ignored.

Thus, an MSB is generally used to specify the source and sink locations for a page to be moved in the same specified internal medium (e.g. both source and sink are in MS or ES), or between different media (e.g. source in MS or ES, and the sink in the other medium).

Further, this invention provides an asynchronous coprocessor interface by which a processor may request that a group of page frames anywhere in an electronic storage hierarchy be set to zeros (cleared) while the requesting processor continues normal execution.

When a zeroing control bit (Z) is provided as a flag field in the source specification in an MSB, the move operation is changed to eliminate the accessing of the source page(s) and to only access the sink pages to control the writing of a predetermined padding character, such as zero, through-out the content of the sink page(s). The Z-bit for sink pages has no meaning.

Still further, this invention provides an asynchronous interface by which a processor may request that a particular page (or set of pages) be replicated in a group of page frames anywhere in an electronic storage hierarchy while the requesting processor continues normal execution. Replication at the sink location requires only a single fetch of specified source page(s), which are then copied any number of times at the sink location for replication. When the replication function (R) is specified, the source page(s) are replicated into each sink page(s). The Page Count in the MSB controls the number of source pages that are replicated. A Replication Count Field in the sink specification controls the number of such replications performed.

The virtual addressing in the MSB instruction differs from the prior move page MVPG instruction in U.S. application Ser. No. 07/424,797 (PO9-89-018), now U.S. Pat. No. 5,237,608. That application synchronously controls the page movement with central processor (CP) operations wherein the CP cannot do any processing while its requested page movement is being done. On the other hand, the MSB co-processor asynchronously can control the movement of any number of virtually addressed pages while other processing is being done by the requesting CP. CP requests for asynchronous page transfers are made by any CP application program requesting the system control program to execute a start subchannel (SSCH) instruction (defined in the ESA/390 computer architecture described in the ESA/390 Principles of Operations having form number SA22-7201-00 for ordering the publication from the IBM Corporation.

DETAILED DESCRIPTION OF THE DRAWINGS

FIG. 1 is a general diagram of a computer electronic complex (CEC) containing asynchronous data mover (ADM) hardware represented as a co-processor in the CEC.

FIG. 2 represents the addressing structure for ADM invocation and execution within an ADM program using move specification blocks (MSBs).

FIG. 3 illustrates a preferred form of a move specification block (MSB).

FIG. 6 is a flow diagram of the operation of a CCWEXE microcode routine used in the flow diagram in FIG. 5.

FIG. 8 is a flow diagram of the operation of a SENSE microcode routine used in the flow diagram in FIG. 6.

FIG. 9 is a flow diagram of the operation of a SENSE ID microcode routine used in the flow diagram in FIG. 6.

DESCRIPTION OF THE DETAILED EMBODIMENT

ADM Co-processsor Environment

Figure 4A:
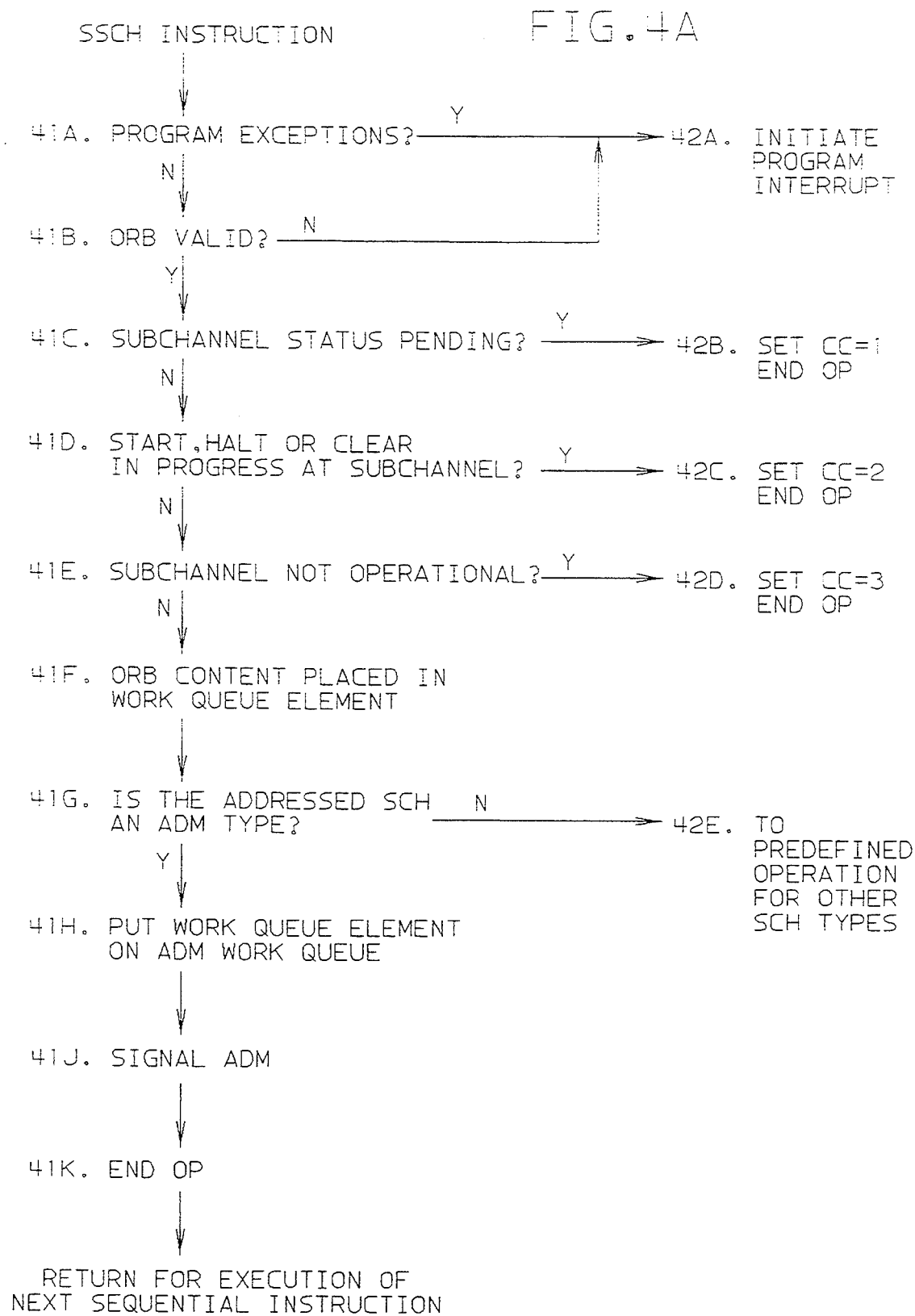
FIG. 4 is a flow diagram of the operation of the ADM Start Subchannel (SSCH) operation.
FIG. 4B is an overall flow diagram of the ADM co-processor operation for processing a work element from the work queue.

FIG. 1 illustrates a computer electronic complex (CEC) which contains an ADM co-processor 20 which services the asynchronous page move requests in programs executed by a plurality of central processors 1 through N sharing an electronic storage hierarchy. The SCE is a part of any conventional IBM ES/9000 system in the prior art for controlling storage accesses. The SCE provides a signalling mechanism for signalling all elements in the CEC. The SCE performs the following functions important to the preferred embodiment of this invention:

1. Storage accesses (fetch and store) to main storage (MS) on word boundaries.
2. Storage accesses (fetch and store) to expanded store (ES) on a page boundary transferring one page of data per access.
3. Page transfer control from MS to either MS or ES outside of any CP cache, and from ES to either MS or ES outside of any CP cache. (Each CP may have one or more private caches and a shared cache with other CP's.)
4. Page zeroing in either MS or ES without transferring a data page of zero characters from another page in storage or affecting any CP cache under control of a Z bit in a storage request.
5. Signalling mechanism to enable any element to signal any other element in the CEC via SCE busses.

Each CP in the CEC executes application programs and the system control program that manages the hardware and software resources in the CEC system. The instructions which comprise any program for any CP is loaded into the CP caches from MS, as well as any data the program requires. The CPs operate in a typical multi-processing manner with data coherence controlled by the SCE.

Application and subsystem programs use ES for temporary storage of large amounts of needed data, which must be moved to MS before it can be used by a program. The system control program also uses ES as a paging store, and thus moves pages of data/programs between ES and MS to free-up MS for allocation to other programs and their data. Programs generally use ES for one of two uses: as a cache of data under program control, or as an intermediate work file. Because of the wide disparity in the access time of obtaining a page from ES and the time to access a page from a DASD device on a conventional channel, the ES can be used as an effective storage media where any data to be accessed cannot fit into the MS allotted for the particular data object or purpose. Where a temporary work file in a programming process exceeds the size that can be allocated for it in MS, but will fit in the normally much larger ES, the use of ES as a storage device will substantially decrease the execution time of the process. Where the data transfer occurs asynchronously to the CPs of a CEC instead of synchronously (as in the use of a Move Page (MVPG) instruction) the reduction of execution time will be accomplished with significantly reduced processor time. In the MVPG scenario, the processor must wait while each page of data is moved, but in the ADM asynchronous scenario, a processor executes other instructions simultaneously with the data moves because those moves are under control of the coprocessor.

Application programs often copy large numbers of pages of data from one MS buffer to another MS buffer when different components of a program have to process the same data, but must keep separate copies of the data for integrity, security or algorithmic reasons. Thus, an application, a programming subsystem or a control program can move pages of data within MS, within ES, or between ES and MS by using an ADM facility in the CEC without incurring a large CP time overhead.

To process instructions and data, and to communicate with the rest of the system, the CPs send storage commands, which are comprised of data and signals on busses to the SCE which connect the CPs to the SCE. Data and instructions are fetched from MS by any processor sending a storage fetch command to the SCE. Similarly, data is stored into MS by sending a storage store command to the SCE with the data. Signalling between elements in the CEC is accomplished by a processor sending a signal command to the SCE with the ID of the receiving element, and SCE signalling control logic forwards the signal to the correct receiving element.

In FIG. 1, MS 23 is the repository of data and programs that the system can execute. Data lines are accessed in MS by the CPs via the SCE function. A CP can access any byte, word, or set of words in an accessed data line. Multiple CPs can concurrently fetch or store allocated areas in MS with their accesses managed by SCE coherency controls described in the prior art.

A hardware storage area (HWA) 26 is physically part of MS, but the HWA can only be accessed by microcode or under hardware control (it cannot be accessed, or addressed, by application or control programs executing on any CP.) The HWA contains system configuration control blocks, work queues, interruption queues, subchannel control blocks, and other communication areas for the CPs, channels, and ADM functions.

The ES 24 stores page units of data which can be accessed only as page units. ES can store many times more data than MS, and is the repository of data not immediately needed in MS for execution by a CP, such as for backing buffers, paging storage, and temporary data storage. The SCE contains the controllers for both MS and ES. The SCE also contains the MS and ES busses and logic used to control the movement of data between the SCE and either MS or ES, and the movement of data for pages between MS and ES. Although other page sizes are possible, in the preferred embodiment the page units are 4 KiloBytes (KB). The SCE busses to MS and ES are conceptually wide enough to handle all bits in a page in parallel, however current MS and ES busses are smaller than a page of bits because of hardware and cost constraints. In current implementations a line size is selected as the width of a single transfer to or from storage, based on a cost performance evaluation. An integral number of lines form a single page. The line size selected for ES transfers may be different than that selected for MS transfers but generally it is preferable that the ES line size be a multiple of the MS line size, e.g., twice the size, or four times the size, if they are different. Regardless of the implementation, programs may only specify full page transfers to or from ES, while MS may be addressed at the byte-level in appropriate instructions. The SCE and the MS and ES controllers make MS and ES available for access by CPs, Coprocessors, I/O processors, and I/O Channels.

The I/O channel subsystem 22 provides the input/output functions of the system, by executing channel programs (which are sets of CCWs in MS) that control the transfer of data between MS and I/O control units and devices.

ADM CCW List—FIG. 2

FIG. 2 illustrates how lists of MSBs are accessed through the execution of an ADM SSCH instruction. The ADM SSCH instruction indirectly invokes the ADM 20 to perform a page move operation by passing the ADM CCW List 31 and the addressed MSBs to the ADM 20 for asynchronous execution. This instruction is restricted to privileged programs, e.g. control programs. FIG. 3 illustrates the preferred embodiment form of the unique ADM MSBs.

In FIG. 2, a ADM CCW list 31, and one or more associated MSB lists 32 are stored in MS prior to executing the ADM SSCH instruction which will require them for its correct execution. This storing is done at the request of the program requesting the ADM SSCH instruction as the ADM co-processor will eventually require these lists to perform the desired page move operations.

The ADM CCW list 31 may contain any number of ADM CCWs, e.g. ADM CCW 1 through ADM CCW k, and list 31 may contain as little as one ADM CCW. Each ADM CCW 31 addresses (points to) one MSB list 32.

Each MSB list 32 may contain any number of MSBs, e.g. MSB 1 through MSB e, any MSB list 32 may contain as little as one MSB. The MSBs in a single list 32 are contiguously located in MS. But the different MSB lists 32 are located in non-contiguous MS locations addressed by the respective ADM CCWs in list 31. The MSB list specifies all of the page moves controlled by one ADM CCW (which points to the respective MSB list). The CCW program may include more than one ADM MOVE CCW and thus more than one MSB list.

Each MSB in any MSB list controls the copying of one or more pages from a source location (defined by a source specification) to a sink location (defined by a sink specification). Either source or sink location may be in ES or MS, or both may be in MS or in ES. The locations may be specified as absolute addresses or as virtual addresses.

MSB Structure—FIG. 3

FIG. 3 illustrates the preferred form of the MSB, which has two parts that respectively specify addresses for source and sink locations for the page transfers represented by the respective MSB specification.

The source part of the specification is shown in words 0-1 and words 2-3. And the sink part of the specification is shown in words 4-5 and words 6-7.

Words 0-1 contain a flags field, a page count field, and an STD field. Words 2-3 contain an offset field. Words 4-5 contain a flags field, a replication count field, and an STD field. Words 6-7 contain an offset field.

The meanings of the various fields used in both the source specification and the sink specification of an MSB are as follows:

The page count (CNT) field contains the number of contiguous pages in the set of pages specified to be moved by this MSB. For a page move operation, this field applies to both the source and sink specifications. However, for a replication, the page count is the number of pages addressed by the source specification that will form the unit of replication. The number of such replications that are to be done is specified in the replication count field in the sink specification. Thus, the total number of sink pages that will be overwritten is the product of the page count and the replication count. For example, if a single page is to be replicated fifty times, the page count field will have a value of one, while the replication count value will be fifty. On the other hand, if a data structure of eight pages is to be replicated ten times, the page count field will contain eight and the replication count 10. In this case, 30 pages at the sink location will be overwritten. In the case where the source flags Z flag is 1, the source count field specifies the number of contiguous pages at the sink location in which zero bits are written in all bytes of the sink pages.

Where virtual addressing is specified for an operand in the flag field, the STD field contains the segment table descriptor to be used for translating the virtual address of each page in this specification. The STD is defined in the ESA/390 Principles of Operation as containing a segment table origin (STO) and a segment table length (STL). The STO is the real address of the segment table which defines the address space used in the address translation of the virtual page addresses.

The offset field contains the address of the first page in the set of pages to be moved by this specification in the MSB. The offset field has its meaning determined by the settings of the V, M and/or E flag bits, as follows:

If V=1, the offset field has a virtual address within the virtual space defined by the STD in the STD field. M and E bits are ignored in this case. The media and the address within the media are specified in the Page Table Entry as defined in U.S. patent application Ser. No. 07/424,797.

If V=0 and M=1, the offset field has an absolute MS address.

If V=0 and E=1, the offset field has an ES block number, which is the real address.

The flag field contains the following flag bits: C, Z, V, M, E and R. Each flag bit has a separate flag function with the following meaning:

C is a last MSB field. If C=0, this MSB is the last MSB in the set for the current CCW. If C=1, this MSB is not the last MSB in the set for the current CCW, and the next follows in the next contiguous bytes in MS following this one. C is only specified within the source flag specification and is ignored in the sink flag specification.

Z is a zeroing control flag bit. If Z=1, any source page(s) specified by this MSB are ignored (they are not copied), and zero bits are written into the specified sink pages. Z is only specified within the source flag specification and is ignored in the sink flag.

V is a virtual flag bit. If V=1, flag bits M and E are ignored, and the offset field contains the virtual address for the page(s) accessed by this MSB within the space defined by the STD field. If V=0, flag bit M or E is tested and if one, the offset field contains the absolute MS or real ES address for the page(s) represented by this MSB specification.

M is an MS absolute address flag. If M=1, the associated offset field contains an MS absolute address. If M=0, the associated offset field does not contain an MS address.

E is a ES real address flag. If E=1, the associated offset field contains an ESBN (ES block number), which is an ES absolute address. If E=0, the associated offset field does not contain an ES address. R is a replication flag in the MSB source flags. It specifies that the contents of one or more contiguous pages at the source location are to be replicated in the sink locations. If R=1, the page count represents the extent in pages of the source operand that will repeatedly be copied to the sink location. The replication count specifies the number of times the source replication page set will be copied into the sink locations. The number of sink pages overwritten is the product of the page count and the replication count. The source and sink location media are determined by the settings of the V, M and E flags. The R flag is not defined for the sink operand flags.

ADM Start Subchannel (SSCH) Instruction Execution—FIG. 4A

The execution of a SSCH to an ADM SCH has two parts: synchronous and asynchronous. In this embodiment, the CP SSCH microcode program recognizes that an ADM subchannel has been addressed by GR1. This requires that the request be placed on the ADM work queue and the ADM signalled that a work request has been queued for it. That completes the synchronous part of the SSCH instruction and the CP proceeds to the execution of the next instruction following the SSCH. The ADM Co-processor will complete the asynchronous portion of the ADM SSCH operation by moving the specified pages asynchronously, while the requesting CP continues processing other instructions.

In Step 41A, the CP microcode tests operands for exception conditions such as invalid subchannel or addressing exceptions and, if none exist, continue to 41B. Otherwise, go to Step 42A to present program exception.

In Step 41B, CP microcode tests the operation request block (ORB) fields for valid flags. If fields are invalid, present program exception. Otherwise, continue to Step 41C.

In Step 41C, if the subchannel is already status pending, then go to 42B to set condition code=1, indicating status pending, and end the operation. Otherwise, continue to Step 41D.

In Step 41D, if a Start, Halt or Clear is already in progress at the subchannel, then go to Step 42C to set the condition code=2, indicating busy, and end the operation. Otherwise, continue to Step 41E.

In Step 41E, if the subchannel is not operational, go to Step 42D to set the condition code to 3, indicating invalid subchannel, and end operation.

In Step 41F, copy the contents of the ORB to the work queue element.

In Step 41G, test whether the addressed SCH is of the ADM type. If yes, go on to Step 41J. If not, go to pre-existing processing for other SCH types.

In Step 41H, place a work queue element on the bottom of the ADM work queue. This work queue element points to the designated subchannel.

In Step 41J, the CPU signals the ADM co-processor via the SCE that a work element has been placed on the ADM work queue.

In Step 41K, the synchronous CPU portion of SSCH is complete and the SSCH instruction completes with condition code=0.

The CPU continues on to execution of the next sequential instruction.

ADM Work Queue

The information put into each element in the ADM WQ by an ADM SSCH instruction is obtained as follows: The ID of the issuing subchannel is provided by the SSCH instruction in a CP general register, and the subchannel ID is put into the WQ element. The ORB contents are copied into the ADM WQ element. This information includes the first CCW address. The ORB (operation request block) is addressed by an operand of the executed ADM SSCH instruction.

The ADM co-processor accesses work elements in the WQ in FIFO order, removes the top one, and performs the page move operation represented by that element. Eventually each work element progresses from the bottom to the top of the WQ. The ADM co-processor will be in a busy state as long as it is executing elements on the WQ. Thus, newly requested work is put on the bottom of the WQ when the co-processor is busy handling a prior work request from the WQ.

The ADM co-processor executes the ADM CCW list 31 in FIG. 2, addressed by the first CCW address provided in the respective WQ element. These CCWs are contiguous in MS except when a TIC CCW is executed which locates the next ADM CCW in the list 31 at a non-contiguous location in MS. The first CCW in list 31 is generally an MSB one which addresses the first MSB in the MSB list 32 previously stored in MS.

Each element in the ADM WQ is eventually executed by the ADM micro-code program, using its execution unit hardware, as the ADM executes each next element of work on the WQ in sequence.

Interruption Queue

Whenever the ADM completes all work for a WQ element, the ADM micro-code program causes an element to be added to the bottom of the CEC I/O interruption queue (IQ) and to signal all CPs that a completion report has been added to the IQ. Eventually, one of the CP's will accept the interruption and relay it to the control program in the manner predefined in ESA/390 Architecture. The predefined conditions of ESA/390 Architecture control the acceptance of an interruption by a particular CP, namely, the control program has enabled it for I/O interruptions and has masked the CP to receive an interruption of the subclass defined in the specific SCH by means of which the ADM operation was passed to the ADM COP, and through which it is reporting completion.

The first CP in the CEC to be enabled for I/O interruptions by the system control program will remove the top element in the IQ, examine the element, and generate an interruption code which is put into a predefined area in MS (the prefix save area), PSA, of the CP chosen by the control program to handle that element. That CP loads the I/O interruption PSW in that CP to redirect the execution to the control program which then tests the interruption subchannel status to determine that the page move is completed successfully so the pages of data moved by it can be used. (The ID of the issuing subchannel in each IQ element identifies the requesting program in control program tables to correlate it with the indicated page move completion.)

Figure 4B:
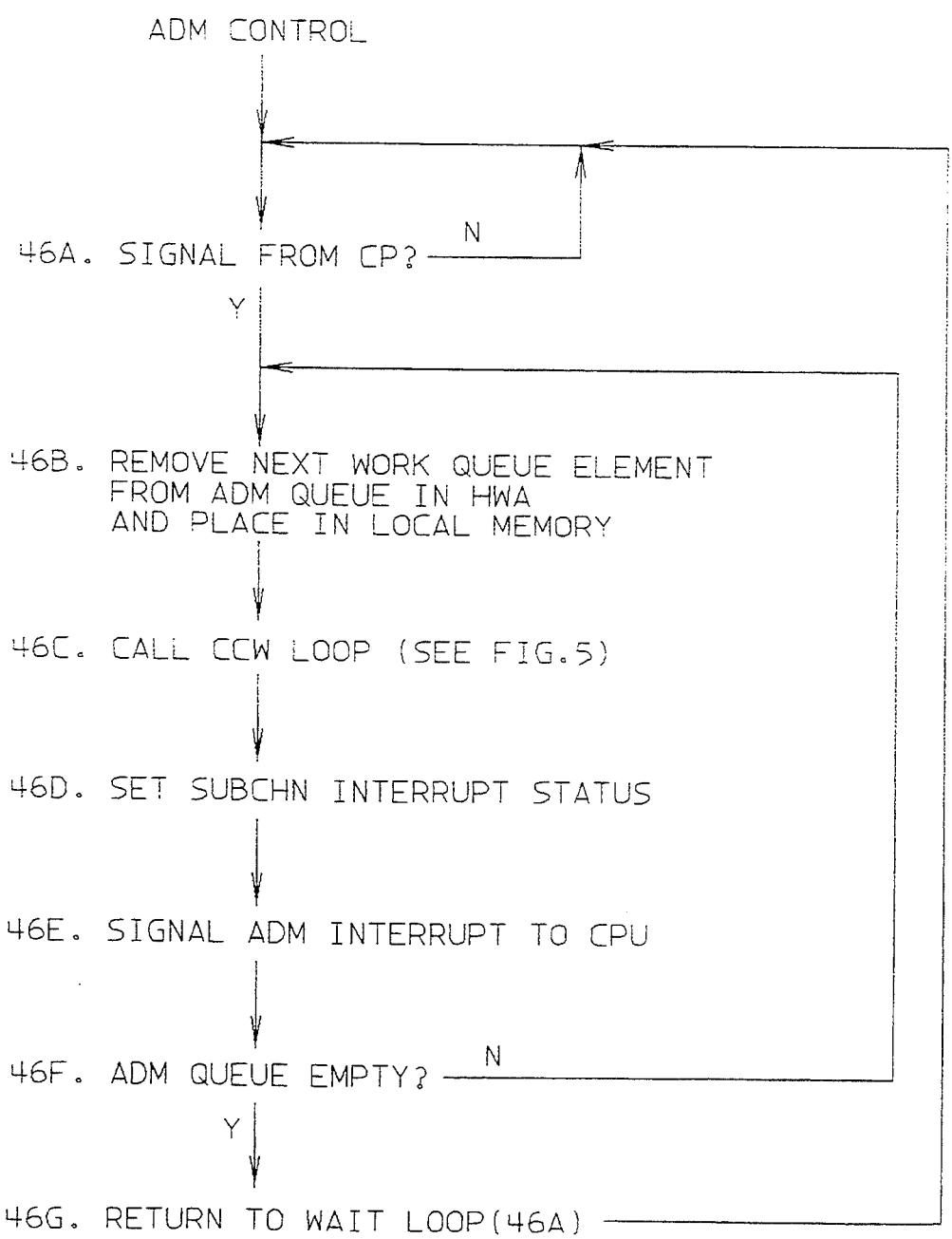

ADM Control Process—FIG. 4B

The Steps in the preferred embodiment for executing the overall ADM control process are shown in the flow-diagram of FIG. 4B, which perform the process previously described with respect to FIGS. 1, 2 and 3. This process executes each MSB according to the specification contained therein as defined above.

Step 46A occurs when the ADM receives the CP signal from FIG. 4A Step 41J as a result of a SSCH instruction. This signal from the CPU via the SCE to the ADM co-processor removes the ADM processor 20A from the wait state, if it is not working on a previous request and begins program execution at Step 46B in FIG. 4B. In Step 46A the work element defines the page move work requested by this ADM SSCH. At Step 41J, FIG. 4A, the CPU used a SIGW signal to signal the SCE to send a signal to the ADM facility to indicate to it that the CPU has put an element on the ADM work queue in the HWA storage area.

The ADM operates independently of the CPU. The ADM obtains and executes the element at the top of the queue because it is the oldest element in the work queue. Thus the ADM may be busy executing another element from the work queue when a new element is put onto the queue. In this case, the SIGW signal from the CPU can be ignored since the WQ is examined for more work at the end of processing of each element from the queue. Or, the queue may be empty, and the ADM may be idle (indicated by it being in a wait state) when it is signalled that a new element is being put on its work queue, and then the ADM can immediately access the new element and start executing it.

The ADM enters Step 46B whenever the ADM is available for performing a next work element on the ADM WQ and the queue contains an element to process. In Step 46B, the ADM removes the top element from the ADM queue, and in Step 46C the ADM calls its "CCWLOOP" micro-program routine to begin processing the removed element. A content of the removed element points to the first CCW in a required ADM CCW program (located in MS) that addresses a set of MSBs that specify the requested page moves.

Upon successful completion of the CCWLOOP routine, it returns control back to the ADM control routine which then executes Step 46D. Step 46D sets the completion status condition for the subchannel.

Then in Step 46E the ADM signals a pending interruption state for the associated ADM SSCH to indicate that its work has been completed on the operation requested on that subchannel. A signal is sent to all CPU's in the CEC using the I/O interruption facilities in the system to indicate that the work has been completed and the status of the completion. The first CPU to take that interruption will clear the interruption from the view of all CPUs in the system. The CPU taking the interruption will resume the execution of the control program at the instruction addressed by the I/O interruption PSW.

As soon as the ADM facility signals the CPs through the SCE indicating the subchannel's interruption pending state, the ADM facility checks the ADM work queue to look for more work requests. The ADM work queue will either be empty, or not empty with one or more work indicating elements. Step 46F tests the empty state of the queue. If it is empty, Step 46G is entered to put the ADM facility into a "wait" state, in which case a non-dedicated co-processor will do non-ADM work, if available. But if the ADM facility is on a dedicated co-processor, it will wait until it is signalled that the queue has received a work element.

However, if the MSB work queue is not empty, the process branches back to Step 46B to remove the next element on the queue, which is now at the top of the queue, and the process continues in the manner previously described.

Figure 5:
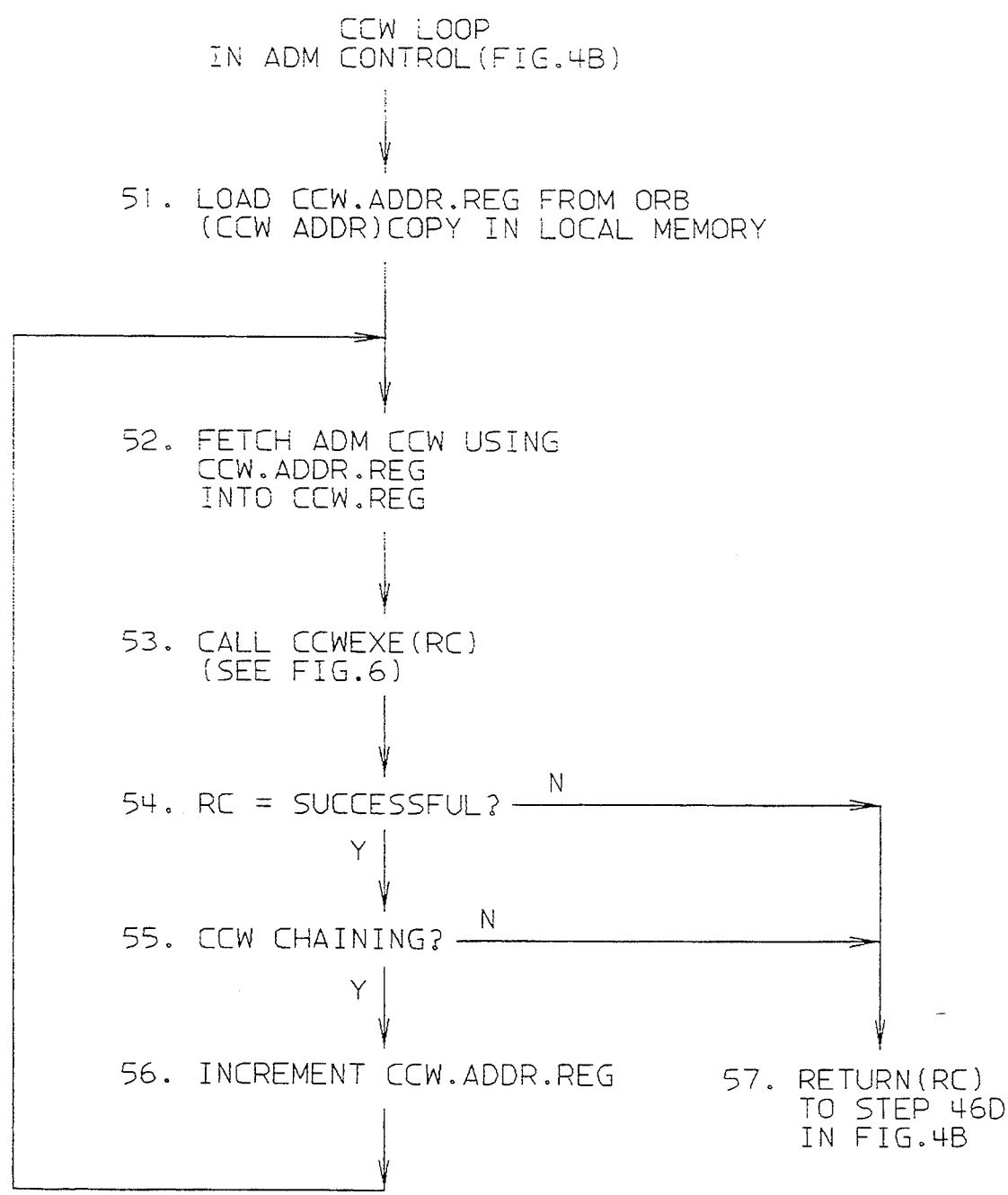
FIG. 5 is a flow diagram of the operation of a CCWLOOP microcode routine used in the flow diagram in FIG. 4.

MSB CCWLOOP Process—FIG. 5

FIG. 5 represents the CCWLOOP process, which is an expansion of Step 43 in the MSB control process in FIG. 4B. CCWLOOP accesses and controls the execution of each CCW in the ADM CCW list 31.

The absolute MS address of the first CCW in the ADM CCW list was found in the ORB (operation request block). The ORB was initialized by the operating system prior to the current ADM SSCH instruction being executed.

Initially, Step 51 loads this CCW address from the ADM WQ element (where it had been copied from the ORB) into an assigned local GPR (called CCW.ADDR.REG) in the MSB facility.

Then Step 52 fetches the next CCW to be executed in the CCW list using the CCW.ADDR.REG and places it into another local GPR (called CCW.REG) in the MSB facility from which it is executed. Initially, the CCW.REG receives the ADM CCW addressed by the CCW.ADDR.REG as the first CCW in the ADM CCW list 31. On each following iteration of this program loop, the next CCW in the CCW list 31 is loaded into CCW.REG by Step 52. CCW.ADDR.REG is incremented after each CCW is accessed so as to proceed through the list.

Next Step 53 calls an CCWEXE microcode routine to interpret and execute the current CCW in the CCW.REG.

Then Step 54 checks the return code (RC) from the execution of the CCWEXE routine during Step 53. If the return code indicates that the CCWEXE routine failed (by indicating an error or exception condition), the no exit is taken from Step 54 to Step 57 which ends the CCWLOOP execution and passes back an exception return code to Step 44 in the ADM control micro-program, in which its next Step 45 signals the error condition to the CPU's of the system via a CPU interruption signal for handling by the first CPU eligible to handle the interruption.

If Step 54 finds the CCW execution return code from the CCWEXE micro-program indicates a successful operation, then Step 54 takes its yes exit to Step 55.

Step 55 checks the Chain Command flag in the current CCW to determine if the next CCW should be fetched and executed. If the Chain Command flag is off, then the currently executed CCW is the last CCW in the current CCW list 31, which now has its execution completed, and the no exit is taken from Step 55 to Step 57 with a return code (RC) indicating the current CCW list executed correctly being provided to the ADM control micro-program.

But if Step 55 finds the Chain Command flag on, the current CCW is not the last, and the yes exit is taken to Step 56 which increments the current CCW address (by incrementing the content of the CCW.Addr.Reg) to address the next CCW in the CCW list 31, and the process goes to Step 52 to repeat the execution of the CCWEXE routine process for the next CCW, and so on until the end of the current ADM operation request.

MSB CCWEXE Process—FIG. 6

FIG. 6 represents the CCWEXE process, which is an expansion of Step 53 in the CCWLOOP control process in FIG. 5. CCWEXE executes the current CCW provided by the CCWLOOP routine. CCWEXE interprets the operation code in the current CCW and calls an appropriate sub-routine when required to complete the execution of the CCW.

Any one of several operation codes may exist in the current CCW, including the MOVE, NOOP, SENSE, SENSEID or TIC return code. All of these operation cede types may exist in a plurality of CCWs in a single ADM CCW list for moving any number of pages. The CCWEXE routine tests the current CCW operation code for each of these five different types of CCW operation codes. If a match occurs, a yes exit is taken from the test Step to call a corresponding routine. When the corresponding routine completes, it provides a return code which is passed back to Step 54 in the CCWLOOP routine. If no match is obtained by the comparison, the no exit is taken to the next operation code comparison Step in the CCWEXE routine.

If no match is found by any of the comparisons provided in the CCWEXE routine, then the current CCW does not have any of the operation codes required in an ADM CCW list, and an exception return code is returned by Step 66 to the CCWLOOP Step 54. Then execution of the CCW list ends, and an abnormal end interruption status pending is signalled through the SCE to the CPs for communication to the first CP eligible to take the interruption, which in turn will interrupt the control program so it may handle the interruption.

Accordingly, the first Step 61 in the CCWEXE routine tests for the MOVE operation code. If it is found, Step 61A calls the MOVE micro-program in FIG. 7 to perform the move specified by the MSBs addressed by the current CCW. If no MOVE operation code is found by Step 61, its no exit is taken to Step 62 which tests if the NOOP (no-operation code) exists in the current CCW. If a NOOP condition is found, the yes exit is taken to Step 62A which returns a zero RC to Step 54. If there is no NOOP code, the no exit is taken to Step 63 to determine if there is a SENSE operation code in the current CCW.

If a SENSE opcode exists, the yes exit to Step 63A is taken which calls a SENSE CCW execution micro-program, from which Step 63B provides a return code to Step 54. The yes exit is taken to Step 64A which calls a micro-program routine that executes the SENSE CCW, and Step 63B provides the return code. The SENSE CCW returns error information that indicates the execution status of the MSB micro-program's immediately preceding operation.

If no SENSE opcode is detected by Step 63, Step 64 is entered to test for another type of sense command which is for the SENSEID operation code. The SENSEID CCW execution returns an identifier indicating the co-processor-type executing the CCW, such as indicating if it is a co-processor type dedicated to the move-page function. If the CCW tests not to be a SENSEID CCW, the no exit is taken to Step 65.

Step 65 tests the CCW opcode to determine if the current CCW command is a TIC (transfer-in-channel), which is a branching CCW. If it is a TIC CCW, the yes exit is taken to Step 67 that takes the branch address from the current CCW and loads it into the local GPR (CCW.ADDR.REG) in the ADM co-processor. Then Step 68 fetches the CCW at the branch address in CCW.ADDR.REG and loads it into the CCW.REG local register, from which the CCWs are executed.

If Step 65 does not find the TIC CCW, it takes its no exit to Step 66 that returns an invalid return code to Step 54 in the CCWLOOP micro-program in FIG. 5 to indicate that an invalid command exception condition should be provided to the program requesting the current page move operation.

Figure 7A:
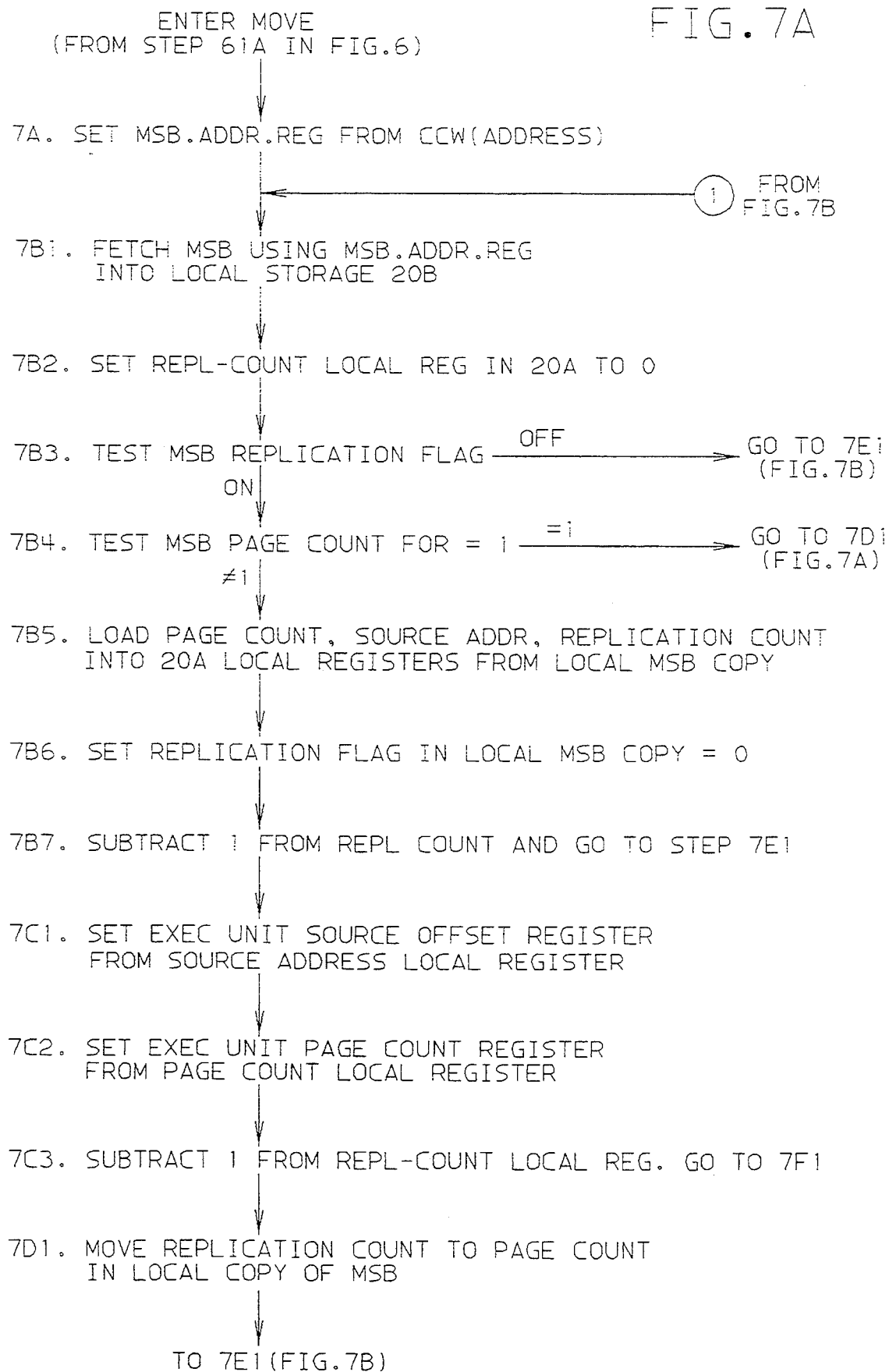
FIG. 7A and 7B are a flow diagram of the operation of a MOVE microcode routine used in the flow diagram in FIG. 6.
Figure 7B:
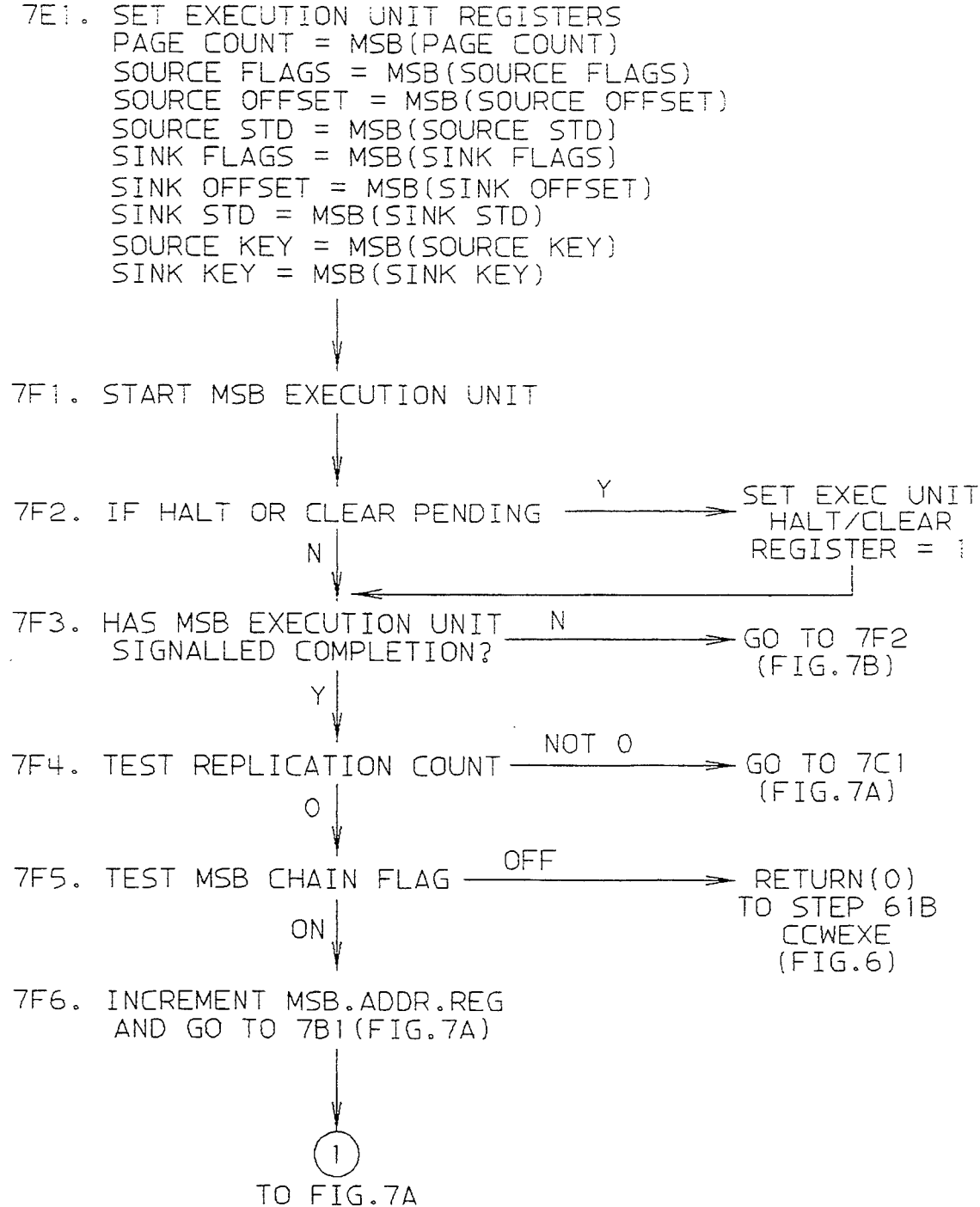

MSB Move Micro-Program Process—FIG. 7

The move micro-program performs the move operations specified by the list of Move Specification Blocks (MSBs) accessed by the current MOVE CCW. Since there may be plural CCWs in a single SSCH requested move operation, the current MOVE CCW may be one of many in the SSCH operation being currently executed. The MSBs in a list addressed by a CCW are located contiguously in MS storage, and the last MSB in the list is indicated by its last MSB bit being set off—the other MSBs in the list have their last MSB bits set on. The data address field of each MOVE CCW contains the MS address of the associated list of MSBs. A single entry into the MOVE microprogram results in the execution of all MSB's in the single list addressed by one MOVE CCW.

The current CCW is in the local GPR designated CCW.REG, and this MOVE CCW contains an address in its data address field which addresses the first MSB of a list of MSBs. Step 7A copies the MS address from the current CCW in the local CCW.REG into another local GPR called the MSB.ADDR.REG register.

Step 7B1 uses the MSB address in the MSB.ADDR.REG register to fetch the MSB from main storage into the local storage 20B of the MSB co-processor.

Step 7B2 initializes the replication count in a REPL.COUNT local register in processor 20B to zero for later testing.

Step 7B3 tests the MSB source flags R field to find out whether replication has been requested. If replication is not specified, control passes to Step 7E1.

Step 7B4 is executed if replication is requested. In this step a test is made as to whether a single source page is to be replicated, in which case a transfer is made to Step 7D1. This test is made because the hardware execution unit only replicates a single source page. When more than one source page is to be replicated in the sink location, the execution unit will be invoked once for each multiple-source-page replication by the Move routine.

Step 7B5 prepares for multiple execution unit invocation by saving the page count (length of replication page set), source address (beginning of each replication page set), and the replication count into local registers. These are obtained from the local storage MSB copy.

Step 7B6 sets the source operand replication flag in the local MSB copy to zero since the execution unit does not perform multiple source-page replications.

Step 7B7 subtracts one from Replication Count and goes to Step 7E1.

Steps 7C1, 7C2 and 7C3 are only executed before a second and subsequent invocations of the execution unit to perform multiple page replications. Step 7C1 sets the execution unit source offset register from the local register saving it to reset it back to the beginning of the replication page set. Step 7C2 sets the execution unit page count from the local page count register to perform one multi-page replication. Step 7C3 subtracts one from the replication count in the local register holding it (saved in Step 7B5) to prepare for a later completion test. Control is transferred to step 7F1 for the next execution unit invocation.

Step 7D1 moves the replication count to the page count field of the local copy of the MSB. This is for the single page replication case, which the execution unit will execute completely by replicating the single source page the number of times specified in its Page Count Register, loaded from the page count field of the local MSB.

Step 7E1 sets the required execution unit registers from the local copy of the MSB for the first invocation of the unit for processing the MSB.

Step 7F1 signals the MSB execution unit to perform the page moves specified in its internal registers (set in Steps 7E1 and partially in Steps 7C1 and 7C2).

Steps 7F2 and 7F3 are repetitively executed until the execution unit has completed its specified page move operation. Step 7F2 tests whether a Halt or Clear function has been requested from the host CPU, in which case the execution unit Halt/Clear register is then set to one to stop the ongoing operation. Step 7F3 checks for a completion signal and transfers back to Step 7F2 until it is received.

Step 7F4 tests the replication count in the local register to see if a multi-page replication is still to be completed. If so, control is transferred to Step 7C1 to prepare for the next multi-page replication invocation of the MSB execution unit.

At Step 7F5, processing of a single MSB is complete. The last MSB flag is tested. If this is the last MSB in the list, control is returned to Step 54 of CCWLOOP in FIG. 5. If there is another MSB, increment MSB.ADDR.REG to address the next MSB and transfer control to Step 7B1 to process it.

ADM Sense Micro-Program Process—FIG. 8

The SENSE CCW execution in the ADM facility is represented in FIG. 8. The SENSE CCW for the ADM operates very similarly to the I/O SENSE CCW defined in the IBM ESA/390 Principles of Operation and in prior IBM S/370 Principles of Operation. It provides error information related to the last CCW and of the current ADM execution saved in assigned local registers in the ADM facility, including a CCW.ADDR.REG, MSB.ADDR.REG, PAGE.CNT.REG, SOURCE.OFFSET.REG, SINK.OFFSET.REG, SOURCE.STD.REG and SINK.STD.REG.

Step 81 provides this information from these ADM registers to the MS address specified in the SENSE. Then, Step 82 is entered to return to CCWLOOP process with a return code to prior Step 54 in FIG. 5 to continue on with execution of the CCW list.

ADM SENSEID Micro-Program Process—FIG. 9

The SENSEID CCW execution in the ADM facility is represented in FIG. 9. The SENSEID CCW for the ADM operates very similarly to the I/O SENSEID CCW defined in the IBM ESA/390 Principles of Operation and in prior IBM S/370 Principles of Operation. It provides identification information related to the ADM co-processor type, such as its model number. Step 91 reads this information from corresponding ADM registers. After this information is stored at the CCW data address, Step 92 is entered to return the ADM process with a return code to prior Step 54 in FIG. 5 to continue on to execution of the CCW list.

Dedicated Asynchronous Data Mover Co-Processor Means

The ADM control processes may be performed in any of a number of ways, depending on the system implementation. For example, the ADM may be implemented by sharing the functions of an I/O co-processor, or the ADM may use a processor dedicated to its functions. The choice of a particular form of ADM facility implementation is dependent on the anticipated ADM workload, compared to other workloads in the system in planning for a maximization of the efficiency of system performance.

In FIG. 1, the dedicated ADM co-processor 20 includes means for receiving a signal from any CPU via the SCE, and means for sending a signal to any CPU via the SCE. Such a signal requests an interruption of current processing in the receiving processor.

The ADM co-processor memory 20B is the random access type, byte addressable, accessed via co-processor command and data (CMD & Data) busses. The ADM co-processor 20 can fetch and store data, control code and commands in its local memory; the co-processor can fetch and store data, control code and commands in main storage (MS) 23 and data in expanded storage (ES) 24; and the co-processor can fetch and store data, control code, and queue information from the HWA (26).

The MSB execution unit 20C is a hardware state machine that operates in the co-processor 20 to execute the page moves of one MSB (message specification block) per invocation. Execution unit 20C performs each co-processor storage command to the SCE ES/MS busing logic hardware 21A to accomplish the page moves specified in a current MSB being executed and to fetch tables used for dynamic address translation of source and sink virtual addresses.

Figure 10:
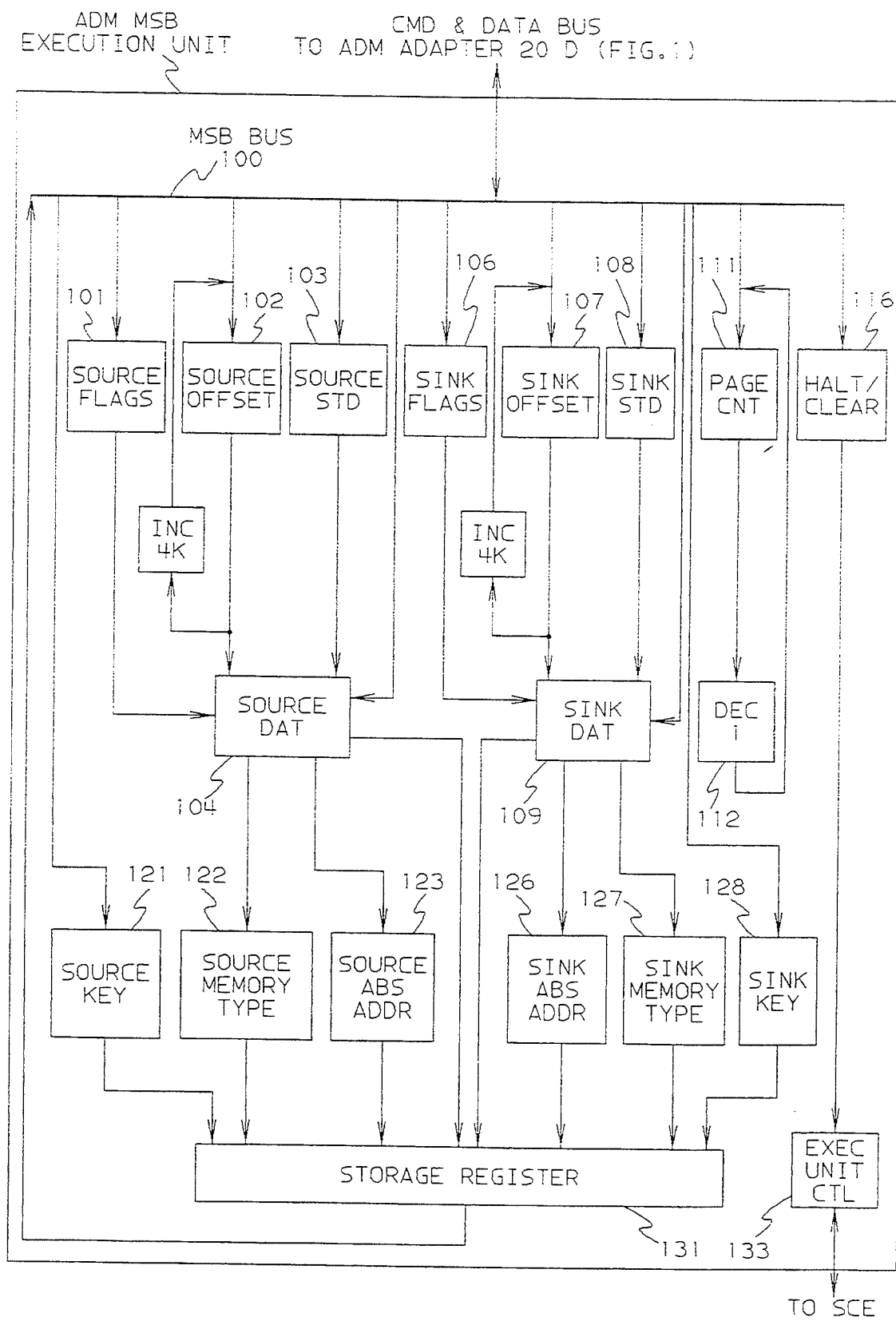
FIG. 10 shows detailed MSB execution unit dataflow logic of the ADM co-processor represented in FIG. 1.

The preferred embodiment of the asynchronous data mover (ADM) includes the coprocessor hardware shown in FIG. 10. ADM is a general purpose processor which may include general purpose registers (GPRs), and it uses the micro-code in a ROS or RAM (read-only store or read-only memory) shown internal to the ADM co-processor 20 for controlling the execution of its instructions. This micro-code for controlling the execution in this co-processor has been described with the flow-diagrams in FIGS. 4 through 9. This processor 20A invokes the hardware execution unit 20C to do the actual moving of the pages. Unit 20C executes using the execution unit controls 133 in FIG. 10. Dynamic Address Translation processing steps 104 and 109 are shown in detail in FIGS. 11A and 11B. DAT processing is part of the move process of execution unit 20C.

Description Of MSB Execution Unit Hardware In FIG. 10

An ADM adapter 20D provides the storage access functions between the ADM 20 and the SCE 21 in FIG. 1. The SCE is used by the processor 20A and the MSB execution unit 20C to fetch and store pages of data from and to the main storage 23 and the expanded storage 24 in the system. The SCE's page-move function is used by the MSB execution unit 20C to move a page from one location in MS or ES to another location in MS or ES. The page move is performed by the SCE internally, using the MS/ES bussing logic 21A in response to page address and control information supplied by the MSB execution unit through the ADM adapter 20D.

During the execution of an MSB in the MSB execution unit 20C, an SCE command (a page move command) is constructed in storage register 131, and this command is forwarded on the ADM bus 100 to the ADM adapter 20D which then places the command on the SCE bus for the SCE to execute.

The SCE storage command has the following fields in storage register 131:
  Source absolute address;
  Source protection key;
  Source memory type (which is either MS, ES, or "zeros" if the Z bit is on in the MSB);
  Sink absolute address;
  Sink protection key; and
  Sink memory type (which is either MS or ES).

The ADM processor 20A sequences through the cycles of operation, described below. The processor receives flags and addresses read from the corresponding fields in the MSB in MS being currently addressed by an MSB CCW to load registers 101-103, 106-108, 111, 121 and. 128. Registers 101-103 input to logic circuits 104 which performs a conventional DAT (dynamic address translation) operation to generate a source absolute (real) address in register 123 and determine from the source flag field the type of medium containing the source page, the type which is put into register 122. Registers 106-108 output to DAT logic circuits 109 which performs a conventional DAT (dynamic address translation) operation to generate a sink absolute (real) address in register 126 and determine from flag field states the type of medium containing the sink location the type which is placed in register 127.

The first iteration of the DAT controls 104 uses the STD IN register 103 if a virtual address is indicated by the flag fields in register 101. The STD is not accessed if a source real address is indicated by the flag bits. The address in the source offset register 102 is then used as a virtual or real address for providing the output of DAT controls to the source absolute (real) address register 123 and the source memory type to register 122, which provides the first source address to storage register 131.

The same process is used for the contents of registers 106-108 operating with the sink DAT 109 to generate the first sink address outputted into register 126, then to storage register 131. Then, the content of storage register 131 contains the first source and sink page addresses, the source and sink keys, and the source and sink memory types (given that in some cases a Z-bit in the memory type field may indicate no valid source address). If the source flag in storage register 131 indicates page zeroing, then the SCE page-move function supplies the source page of zeros internally. The content is provided to the SCE as part of the page-move storage command. The embodiment allows generation of the components of the resulting SCE page-move command to be generated in parallel (simultaneously). That is, the source and sink operand specifications may be generated to storage register 131 by different hardware concurrently, as indicated by the structure depicted in FIG. 10.

The page CNT field in register 111 is decremented by one via decrementer 112, and if the page count is not zero another set of page address generation cycles are performed, at least for the sink pages. No further address generation is performed for the source pages if R=1 or Z=1 in flag register 101.

In this manner each next sink and any source address is generated until the page count in register 111 reaches zero.

If a Halt or Clear signal is received in register 116, the MSB execution process is stopped by controls 133, and the registers are all reset in the case of a Clear command. In the case of Halt, the information remains in the registers and may be obtained through use of a SENSE CCW.

The micro-programs described in FIGS. 4-9 are stored in the MSB local store 20B. The MSB execution unit 20C and its bus 100 are controlled by the micro-programs running on the MSB processor 20A.

The ADM MSB Execution unit (FIG. 10) receives initial MSB field values from processor 20A (shown as Step 73 in FIG. 7). The registers are loaded with the information provided by processor 20A as follows:
  Gate MSB Bus into Source Flags reg 101
  Gate MSB Bus into Source Offset reg 102
  Gate MSB Bus into Source STD reg 103
  Gate MSB Bus into Source Key reg 121
  Gate MSB Bus into Sink Flags reg 106
  Gate MSB Bus into Sink Offset reg 107
  Gate MSB Bus into Sink STD reg 108
  Gate MSB Bus into Sink Key reg 128
  Gate MSB Bus into Page Cnt 111

This is done by communication with the hardware execution unit control 133, which exercises control over the operation of the MSB execution unit hardware as it performs all page-moves requested by a single MSB, except, as explained earlier, in the case of multiple-page replication where a single MSB will cause multiple invocations of the MSB execution unit.

| Start Execution Command Received From Processor 20A (Step 74, FIG. 7): | |
| --- | --- |
| Cycle 1 | If Page CNT = 0 Page Movement is complete and the Execution Control 133 signals Processor 20A that the processing of the MSB is complete and returns to Step 75 FIG. 7. |
| Cycle 2 | Gate Source Flags, Offset, STD into Source DAT; Simultaneously gate Sink Flags, Offset, STD into Sink DAT. |
| N Cycles | DAT operations for a source and a sink page. DAT depends on the time it takes to fetch DAT tables out of MS. |

Wait for address valid from Source & Sink DAT, then do the following cycles to gate data from DAT to registers 122-123 and 126-127:

| | |
| --- | --- |
| Cycle N + 1 | Gate Source MT into Source Memory Type reg 122 |
| Cycle N + 2 | Gate Source ABS REG into Source ABS ADDR reg 123 |
| Cycle N + 3 | Gate Sink MT into Sink Memory Type reg 127 |
| Cycle N + 4 | Gate Sink ABS REG into Sink ABS ADDR reg 126 |
| Cycle N + 5 | Gate Source & Sink key, Addr and Memory type regs into Storage Reg 131. Cycle N+6 |
| Gate Storage Register 131 onto Command and Data Bus to ADM Adapter 20D and then on the SCE bus to the SCE. | |
| M Cycles | Wait for the SCE Response. If unsuccessful then go to Done. |
| Cycle M + 1 | Gate decremented page CNT into page CNT reg 111. If Source Flag = Replicate, then Gate incremented Source offset from incrementer 105 into Source offsets reg 102. Gate incremented Sink offsets from incrementer 110 into Sink offsets reg 107. |

| | |
|---|---|
| Cycle M + 2 | If Halt/Clear register is set, then go to Done, but if Halt/Clear register is not set, then |
| Cycle M + 3 | Goto Cycle 1 to test if page CNT = 0. |
| Done: | Signal ADM processor 20A that MSB Execution Unit is complete. Provide Return Code. |

If processor 20A sets a one into the HALT/Clear Register, then the execution control unit will terminate operation of the MSB execution unit after completion of the current page move.

Thus, the storage command is put in the Storage Reg 131 at cycle N+5, then the command is gated onto the MSB bus 100 in the embodiment for transmission to the ADM adapter 20D. The MSB Execution Unit then waits (some M cycles) for the ADM Adapter 20D to send the command to the SCE, the page is moved by the SCE, after which the SCE send a completion response to the ADM adapter, which is then returned to the Execution Unit Control 133. At cycle M+1 the completion response is analyzed and the execution proceeds to move the next page if more pages remain to be moved.

Figure 11A:
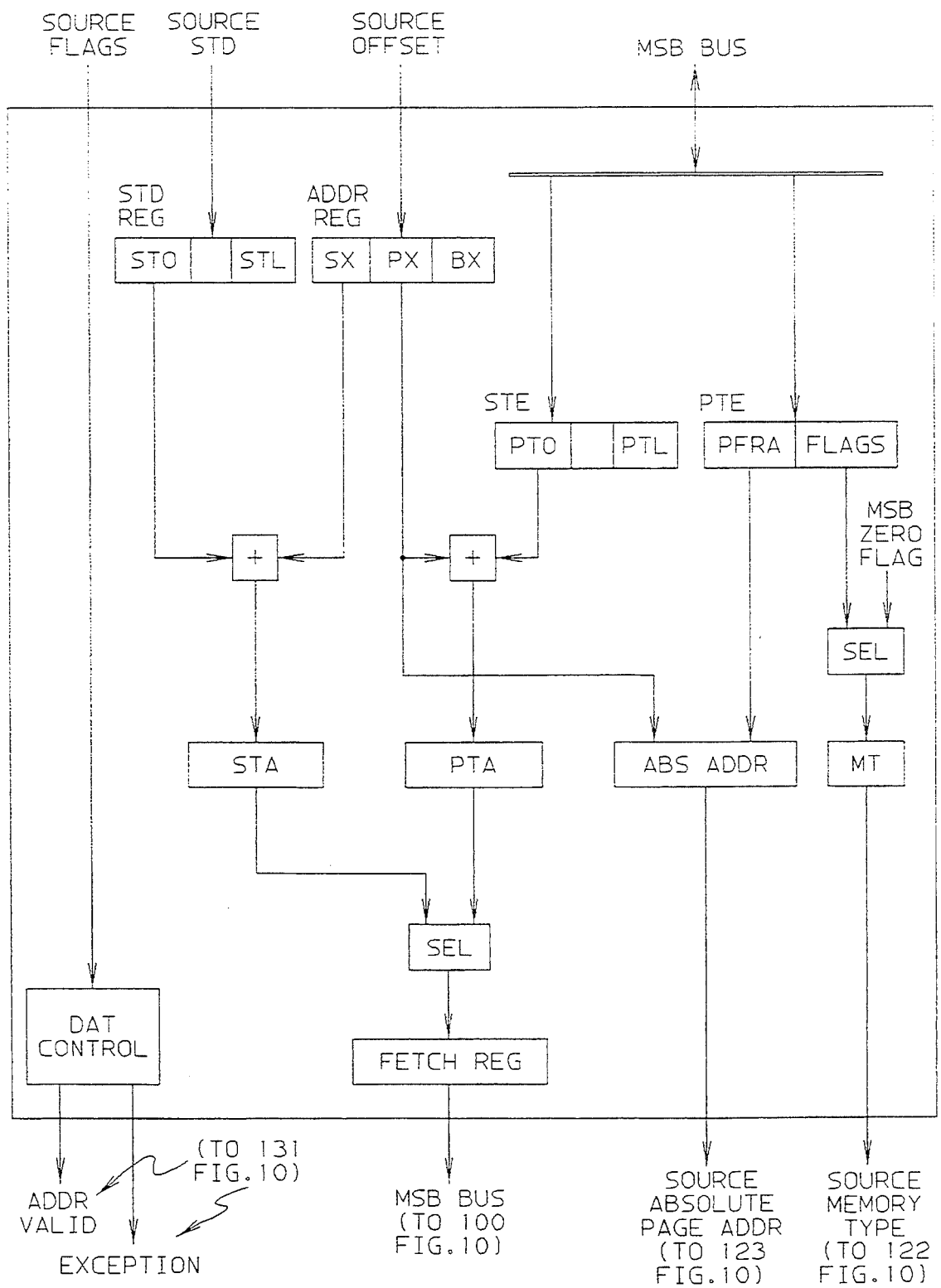
FIG. 11A shows the data-flow logic hardware circuits in the ADM co-processor for performing a source dynamic address translation (DAT) operation, as shown in FIG. 10.

Source DAT Operation By The ADM Co-Processor—FIG. 11A

The ADM co-processor DAT circuits 104 cycle through the cycles of operation described below. The source DAT 104 receives source flags and information from registers 101-103, generates source STE and PTE addresses and accesses the source STE and PTE in MS for source virtual address translation, indicates the source storage medium type, and signals an "address valid" or an "exception", and, if valid, the translated source absolute address, source key, and memory type are loaded into storage registers 131 and will subsequently be sent to the SCE as part of a page-move storage command to access the source page in a move operation for the respective source specification.

```
Cycle 0  Gate Source Flags into DAT Controls, and
         Gate Source Offset into DAT ADDR reg, and
         Gate Source STD into STD REG.
If Source Flag indicates a Zero Sink flag:
    Cycle 1 Gate ZS (Zero Sink) into MT reg
            Gate Source Address Valid signal to MSB
               Execution Unit Control Logic 133.
Or if Source FLAG indicates MS REAL Address:
    Cycle 1 Gate DAT ADDR Reg to DAT ABS ADDR reg
            Gate MS medium indicator into DAT MT reg
            Gate Source Address Valid signal to MSB
               Execution Unit Control Logic 133.
Or if Source FLAG indicates ESBN Real Address:
    Cycle 1 Gate DAT Address Reg to Abs Reg
            Gate ES into medium indicator into DAT MT
               Register
            Gate Address Valid signal to MSB Execution
               Unit Control Logic 133.
If the Source Flag indicates a Virtual Address:
    Cycle 1 Gate DAT ADDR reg(SX) + STD reg (STO)
               into STA reg as the generated STE
               address (as described in ESA/390
               POP and in U.S. Pat. application
               Ser. No. 07/424,797).
            Test DAT ADDR Reg 1-7 against STD REG(STL).
               If greater than STL, generate
               exception, and signal MSB operation
               complete.
         2  Gate STA reg into Fetch reg
         3  Gate FETCH reg onto MSB BUS to access STE
               in MS
         4  Gate MS STE data on MSB BUS into STE reg
            Test DAT ADDR reg bits 1-7 against
               STE(PTL). If greater than PTL,
               generate exception, and signal MSB
               operation complete.
         5  Gate DAT ADDR reg(PX) + STE reg(PTO)
               into PTA reg as the generated PTE
               address (as described in ESA/390 POP
               and in U.S. Pat. application Ser.
               No. 07/424,797).
         6  Gate PTA reg into FETCH reg
         7  Gate FETCH Reg onto MSB BUS to access PTE
               in MS.
         8  Gate PTE data from MS on MSB BUS into PTE
               REG
         9  Gate PTE(PFRA) into ABS ADDR reg as the
               translated source real address
               (as described in ES/390 POP and in U.S.
               Pat. application Ser. No. 07/424,797).
               If PTE Flags = MS, then Gate MS into
               MT REG. If PTE Flags = ES, then Gate ES
               into MT reg. If PTE flag is invalid,
               indicate page fault exception and
               signal operation complete.
        10  Gate Source Address Valid Signal to MSB
               Execution Unit Control Logic.
```

Figure 11B:
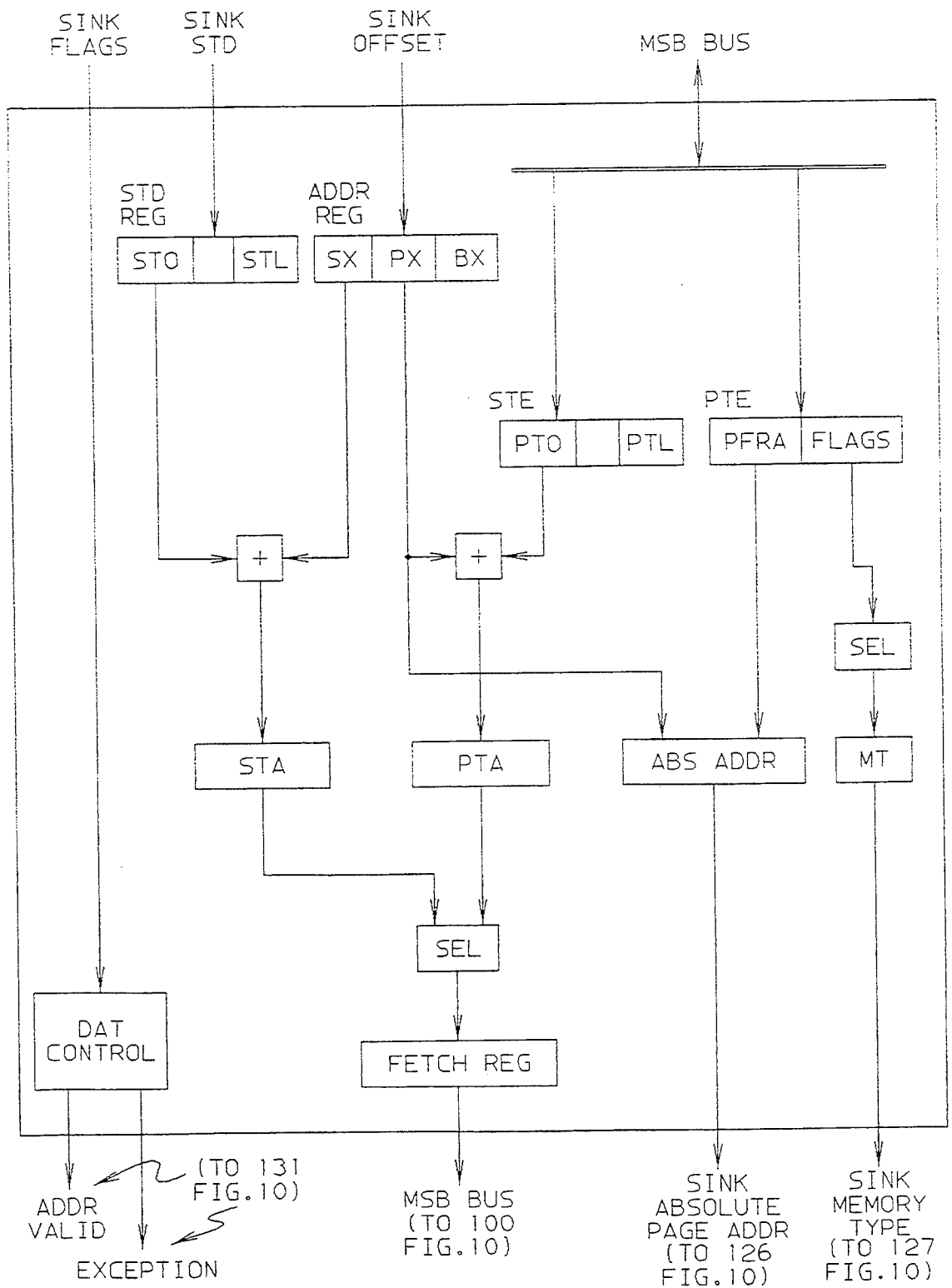
FIG. 11B shows the data-flow logic hardware circuits in the ADM co-processor for performing a sink dynamic address translation (DAT) operation, as shown in FIG. 10.

Sink DAT Operation By The MSB Co-Processor—FIG. 10 and FIG. 11B

The MSB co-processor DAT circuits 109 cycle through the cycles of operation described below. The Sink DAT 109 receives sink flags and information from registers 106-108, generates sink STE and PTE addresses and accesses the sink STE and PTE in MS for sink virtual address translation, indicates the sink storage medium type, and signals an "address valid" or an "exception", and if valid sends the translated sink absolute address to storage register 131 is to form part of the page-move storage command which will be sent to the SCE subsequently to access the sink page in a move operation for the respective sink specification.

```
Cycle 0  Gate Sink Flags into DAT Controls, and
         Gate Sink Offset into DAT ADDR reg, and
         Gate Sink STD into STD reg.
If Sink FLAG indicates MS REAL Address:
    Cycle 1 Gate DAT ADDR Reg to DAT ABS ADDR reg
            Gate MS medium indicator into DAT MT reg
            Gate Sink Address Valid signal to MSB
               Execution Unit Control Logic 133.
Or if Sink FLAG indicates ESBN Real Address:
    Cycle 1 Gate Address Reg to Abs Reg
            Gate ES into MT REG
            Gate Sink Address Valid signal to MSB
               Execution Unit Control Logic 133.
If the Sink Flag indicates a Virtual Address:
    Cycle 1 Gate DAT ADDR reg(SX) + STD reg(STO) into
               STA reg as the generated sink STE
               address (as described in ESA/390 POP
               and in U.S. Pat. application
               Ser. No. 07/424,797).
            Test DAT ADDR Reg 1-7 against STD REG
               (STL). If greater than STL, generate
               exception, and signal MSB operation
               complete.
         2  Gate STA reg into Fetch reg
         3  Gate FETCH reg onto MSB BUS to access STE
               in MS
         4  Gate MS STE data on MSB BUS into STE reg
            Test DAT ADDR reg bits 1-7 against STD
               REG(PTL). If greater than PTL,
               generate exception, and signal MSB
               operation complete.
         5  Gate DAT ADDR reg(PX) + STE reg(PTO) into
               PTA reg as the generated sink PTE
               address (as described in ESA/390 POP
```

-continued

```
           and in U.S. Pat. application Ser.
             No. 07/424,797).
       6  Gate PTA reg into FETCH reg
       7  Gate FETCH Reg onto MSB BUS
             to access PTE in MS.
       8  Gate PTE data from MS on MSB BUS into PTE
             REG
       9  Gate PTE(PFRA) into ABS ADDR reg as the
             translated sink real address (as
             described in ES/390 POP and in U.S.
             Pat. application Ser. No.
             07/424,797).
             If PTE Flags = MS, then Gate MS into MT
                REG.
             If PTE Flags = ES, then Gate ES into MT
                reg.
             If PTE Flags indicate invalid,
                indicate page fault exception and
                signal operation complete.
      10  Gate Sink Address Valid signal to MSB
             Execution Unit Control Logic 133.
```

Although this invention has been shown and described with respect to plural embodiments thereof, it will be understood by those skilled in the art that various changes and omissions in the form and details of the invention may be made therein without departing from the spirit and the scope of the invention.

Having thus described our invention, what we claim as new and desire to secure by Letters Patent is:

1. A method of asynchronous data transfer performed in a data processing system, said data processing system including at least one central processor (CP), input/output (I/O) channels, a co-processor to asynchronously control movement of a set of pages concurrently with continuation of execution by the CP, and two or more random-access electronic (RAM) memories having data bussing connected through a memory controller to control movement of data between and within the random access electric (RAM) memories, said method comprising first the step of:

executing by the CP a start data move instruction having an operand for requesting movement of data page(s) between and within the random-access electronic (RAM) memories without moving any data page through any of the I/O channels, said step of executing by the CP including:

specifying the requested movement of data page(s) in a move specification block (MSB) program indirectly addressed through the operand, the MSB program containing at least one MSB for defining movement of page(s) between and in the RAM memories, storing an address to the MSB in a communication location in one of the random access electronic (RAM) memories, and signalling the co-processor of the CP storing of the address to the MSB to complete CP execution of the start data move instruction for enabling the CP to execute other instructions, and thereafter and concurrently with continued processing by the CP the steps of:

accessing by the co-process an address to the MSB in the communication location and then accessing the MSB, the MSB containing a logical source address in one of the random access electronic (RAM) memories from which the data page(s) are to be copied and containing a logical sink address in one of the random access electronic (RAM) memories into which the data page(s) are to be stored and containing a page count indicating a number of pages to be copied, reading by the co-processor the MSB to obtain the logical source address in one of the random access (RAM) memories and the logical sink address in one of the random access electronic (RAM) memories, address-translating by the co-processor the logical source and sink addresses into corresponding source and sink real addresses when the logical addresses are indicated to be virtual addresses for locating the data page(s) in at least one of the random access electronic (RAM) memories, generating by the co-processor a real-address page-move command containing the corresponding source and sink real address, issuing the co-processor the real-address page-move command to the memory controller, executing by the memory controller the real address page-move command by reading the data page from the source real address in one of the random access electronic (RAM) memories and storing the data page at the sink real address in the same or another of the random access electronic (RAM) memories, the step of executing by the memory controller including the steps of:

incrementing to a next page in the MSB after reading each page until all pages of the MSB are read, and signalling to the co-processor when storing of the pages is completed, and then signalling by the co-processor to the CP a completion status when all pages have been moved for the MSB program as determined from received memory controller signalling.

2. A method of asynchronous data transfer as defined in claim 1, wherein the co-processor reads a page count field in the MSB prior to the issuing step by the co-processor, further comprising the steps of:

sending a sink address signal and a source address signal by the co-processor to the memory controller to address source and sink locations in the random access electronic (RAM) memories, transferring the data page from the memory source location through the memory controller to the memory sink location without moving the data page through any I/O channel for obtaining a high-speed data transfer, and in response to the memory controller signalling the co-processor that a page transfer is completed, the co-processor performing the steps of:

decrementing the page count obtained from the page count field in the MSB, and issuing a next real-address page-move command to the memory controller for moving a next data page when the page count has not been decremented to zero in the MSB.

3. A method of asynchronous data transfer as defined in claim 2, further comprising the steps of:

indicating in the MSB that the logical source address and the logical sink address are in respective ones of the two random-access electronic (RAM) memories, and memory controller transferring the data page between the two electronic memories through the memory controller.

4. A method of asynchronous data transfer as defined in claim 2, the transferring step by the memory controller further comprising the steps of:
  indicating in the MSB that the logical source address and the logical sink address are in the same random-access electronic (RAM) memory, and
  memory controller transferring the data through the memory controller from the source address to the sink address in the same random access electronic (RAM) memory.

5. A method of asynchronous data transfer as defined in claim 1, further comprising the step of:
  storing a queue anchor in one of the random access electronic (RAM) memories for structuring the communication location as a queue in one of the random access electronic (RAM) memories.

6. A method of asynchronous data transfer as defined in claim 1, further comprising the steps of:
  detecting in a MSB by the co-processor a fill indication,
  generating by the co-processor a fill indication for a predetermined fill character in a page move command to the memory controller when the MSB contains a fill indication, and
  writing by the memory controller the predetermined fill character within the content of a page transferred by the page move command.

7. A method of asynchronous data transfer as defined in claim 1, further comprising the steps of:
  detecting by the co-processor a page zeroing indication in the MSB,
  generating by the co-processor a page zeroing indication in a page move command to the memory controller in response to detecting a page zeroing indication, and
  writing by the memory controller the zero character through-out the content of a page transferred by the page move command.

8. A method of asynchronous data transfer as defined in claim 1, further comprising the steps of:
  detecting by the co-processor a replication indication, a page count and a replication count in the MSB, in which the page count indicates a length of a source group of contiguous pages located at the logical source address,
  generating by the co-processor a group of page move commands equal to the page count for respective pages in a source group and sending one command per page to the memory controller to transfer the contiguous pages in the source group to contiguous page addresses starting at the logical sink address, and
  repeating by the co-processor the generating step for a number of times equal to the replication count, copying the same source group of contiguous pages in the source group to a next group of contiguous sink addresses adjacent to a last copied group 9. A method of asynchronous data transfer performed in a data processing system, said data processing system including at least one central processor (CP), input/output (I/O) channels, a co-processor to asynchronously control movement of a set of pages concurrently with continuation of execution by the CP, and two or more random-access electronic (RAM) memories having data bussing connected through a memory controller to control movement of data between and within the memories, said method comprising first the step of:
  executing by the CP a start data move instruction having an operand comprising an operation request block for controlling movement of data page(s) between and within the random-access electronic (RAM) memories without moving any data page through any of the I/O channels, said step of executing by the CP including:
  specifying the movement of data page(s) by a move specification block (MSB) program addressed in the operation request block, the MSB program containing one or more control words (CWs) each locating one or more MSBs for defining movement of page(s) between and in the RAM memories, further comprising the steps of:
  storing an address to the MSB program in a communication area in one of the memories,
  signalling the co-processor of the storing by the CP of the address to the MSB program to complete CP execution of the start data move instruction for enabling the CP to execute other instructions,
  reading by the co-processor of each CW in the MSB, program to locate each MSB,
  and thereafter and concurrently with continued processing by the CP performing the steps of:
  accessing by the co-processor in each MSB a logical source address in one of the random access electronic (RAM) memories from which the data page(s) are to be copied and a logical sink address in one of the random access electronic (RAM) memories into which the data page(s) are to be stored and a page count indicating a number of pages to be copied,
  reading by the co-processor the MSB to obtain the logical source address in one of the random access electronic (RAM) memories and the logical sink address in one of the random access electronic (RAM) memories,
  address-translating by the co-processor the logical source and sink addresses into corresponding source and sink real addresses when the logical addresses are virtual addresses for locating the data page(s) in the memories,
  generating by the co-processor a real-address page-move command containing the corresponding source and sink real addresses,
  issuing by the co-processor the real-address page-move command to the memory controller,
  executing by the memory controller the real address page-move command by reading the data page from the source real address in one of the random access electronic (RAM) memories and
  storing the data page at the sink real address in one of the random access electronic (RAM) memories, the step of executing by the memory controller including the steps of:
  incrementing to a next page in the MSB after reading and storing each page until all pages of the MSB are read,
  signalling to the co-processor when storing of the pages is completed, and
  then signalling by the co-processor to the CP a completion status when all pages have been moved for the MSB program as determined from received memory controller signalling.

10. A method of asynchronous data transfer as defined in claim 9, the co-processor execution further comprising the steps of:
  locating a next sequentially-located MSB, if any, in a set of MSBs contiguously located in one of the random access electronic (RAM) memories, addressing a next MSB in the set of MSBs when the count of pages reaches zero in the current MSB, and locating by the co-processor a next CW, if any, in the the set of CWs when the chaining indicator in a current CW being executed indicates that there are more CWs to be executed in the set of CWs.

11. A method of asynchronous data transfer as defined in claim 10 wherein the CWs are contiguously located in the random access electronic (RAM) memory, the co-processor execution further comprising the step of:

locating a next sequentially-located CW in the set of contiguously located CWs when execution is completed for the current CW by incrementing an address of the CW.

12. A method of asynchronous data transfer as defined in claim 10 wherein the set of CWs are a set of non-contiguously addressed CWs, the co-processor execution further comprising the steps of:

locating a next CW in the set of non-contiguously addressed CWs by a next-CW address field in a current CW when execution is completed for the current CW in a set of CWs comprising an operand of the start data move instruction.

13. A method of asynchronous data transfer as defined in claim 10, the co-processor execution further comprising the steps of:

reading by the co-processor a last CW indicator in a current CW in the set of CWs being executed for indicating a current CW is a last CW, signalling by the co-processor to the CP a completion status for the set of CWs when the last CW indicator is read.

* * * * *